(12) United States Patent
Naito et al.

(10) Patent No.: US 7,869,942 B2
(45) Date of Patent: Jan. 11, 2011

(54) TRAVEL PLAN PRESENTING APPARATUS AND METHOD THEREOF

(75) Inventors: Eiichi Naito, Kyoto (JP); Takahiro Kudoh, Kanagawa (JP); Takashi Tajima, Tokyo (JP)

(73) Assignee: Panasonic Corporation, Osaka (JP)

( * ) Notice: Subject to any disclaimer, the term of this patent is extended or adjusted under 35 U.S.C. 154(b) by 138 days.

(21) Appl. No.: 12/306,603

(22) PCT Filed: Jul. 11, 2008

(86) PCT No.: PCT/JP2008/001866
§ 371 (c)(1),
(2), (4) Date: Dec. 24, 2008

(87) PCT Pub. No.: WO2009/008178
PCT Pub. Date: Jan. 15, 2009

(65) Prior Publication Data
US 2010/0262362 A1    Oct. 14, 2010

(30) Foreign Application Priority Data
Jul. 12, 2007  (JP)  ............................. 2007-183630

(51) Int. Cl.
*G01C 21/00*  (2006.01)
(52) U.S. Cl. .................. 701/204; 701/117; 701/118; 701/209; 701/211; 340/995.19; 340/995.22
(58) Field of Classification Search .................. 701/117, 701/118, 202, 204, 209, 210, 211, 214; 340/995.19, 340/995.22, 995.23, 995.24, 995.25
See application file for complete search history.

(56) References Cited

U.S. PATENT DOCUMENTS

2005/0206534 A1    9/2005    Yamane et al.

(Continued)

FOREIGN PATENT DOCUMENTS

JP    11-94578    4/1999

(Continued)

OTHER PUBLICATIONS

International Search Report issued Aug. 19, 2008 in the International (PCT) Application of which the present application is the U.S. National Stage.

*Primary Examiner*—Gertrude Arthur Jeanglaud
(74) *Attorney, Agent, or Firm*—Wenderoth, Lind & Ponack, L.L.P.

(57) ABSTRACT

A travel plan presenting apparatus includes: a travel history accumulation unit (109) which accumulates, in association with a date and time, pieces of travel history information regarding a travel of the mobile object from a departure place to an arrival place; a travel pattern extracting unit (112) which extracts at least one travel pattern from the pieces of travel history information and generates travel patterns in each of which an order of arrival places other than the final arrival place included in a corresponding one of the extracted travel patterns; a travel plan calculating unit (113) which calculates estimated arrival times at each of the arrival places in the travel patterns extracted and generated by the travel pattern extracting unit (112); and a display processing unit (114) which generates display information for displaying the estimated arrival time for each travel pattern.

9 Claims, 43 Drawing Sheets

U.S. PATENT DOCUMENTS

| | | | |
|---|---|---|---|
| 2006/0069501 A1* | 3/2006 | Jung et al. | 701/209 |
| 2006/0074551 A1* | 4/2006 | Zaitsu et al. | 701/209 |
| 2008/0033633 A1 | 2/2008 | Akiyoshi et al. | |

FOREIGN PATENT DOCUMENTS

| | | |
|---|---|---|
| JP | 2002-181576 | 6/2002 |
| JP | 2002-213982 | 7/2002 |
| JP | 2003-57049 | 2/2003 |
| JP | 2005-233631 | 9/2005 |
| JP | 2005-241519 | 9/2005 |

* cited by examiner

FIG. 3A

| Node ID | Attribute | Value |
|---|---|---|
| N1 | Latitude | Lat001 |
| | Longitude | Lon001 |
| | Number of connection links | 4 |
| | Connection link ID | L1, L3, L8, L12 |
| | ... | ... |
| ... | | |

FIG. 3B

| Node ID | Attribute | Value |
|---|---|---|
| CN1 | Latitude | Lat002 |
| | Longitude | Lon002 |
| | Existence link ID | L1 |
| | ... | ... |
| ... | | |

FIG. 3C

| Link ID | Attribute | Value |
|---|---|---|
| L1 | Initial node | N1 |
| | Terminal node | N5 |
| | Link length | 700 |
| | Width | 15 |
| | Category | General road |
| | Number of interpolation nodes | 2 |
| | Interpolation node ID [1] | CN1 |
| | Interpolation node ID [2] | CN2 |
| | ... | ... |
| ... | | |

FIG. 5A

| Category | Landmark name | ID | Position |
|---|---|---|---|
| Restaurant | Restaurant A | LM101 | Lat101, Lon101 |
| | Restaurant B | LM102 | Lat102, Lon102 |
| Convenience store | Convenience store C | LM131 | Lat151, Lon151 |
| | Convenience store D | LM132 | Lat151, Lon152 |
| Supermarket | Supermarket E | LM151 | Lat151, Lon151 |
| | Supermarket F | LM152 | Lat151, Lon152 |
| . . | . . | . . | . . |

FIG. 5B

| Landmark name | ID | Position |
|---|---|---|
| Home | LM201 | Lat201, Lon201 |
| Workplace | LM202 | Lat201, Lon202 |
| . . | . . | . . |

FIG. 6

| Date | Departure place | Arrival place | Route | | | | |
|---|---|---|---|---|---|---|---|
| Wednesday, March 28, 2007 | LM201 8:43 | LM202 9:25 | L3 8:45 | L9 8:50 | L12 8:56 | ⋮ | ⋮ |
| Wednesday, March 28, 2007 | LM202 20:02 | LM201 20:35 | L38 20:03 | L28 20:06 | L27 20:10 | ⋮ | ⋮ |
| Thursday, March 29, 2007 | LM201 11:30 | LM101 11:54 | L3 11:32 | L9 11:36 | L14 11:38 | ⋮ | ⋮ |
| Thursday, March 29, 2007 | LM101 12:48 | LM151 13:05 | L30 12:49 | L33 12:52 | L42 12:55 | ⋮ | ⋮ |
| Thursday, March 29, 2007 | LM151 13:25 | LM171 13:41 | L43 13:28 | L45 13:32 | L47 13:35 | ⋮ | ⋮ |
| Thursday, March 29, 2007 | LM171 14:38 | LM201 15:11 | L50 14:39 | L54 14:43 | L17 14:49 | ⋮ | ⋮ |
| ⋮ | ⋮ | ⋮ | ⋮ | ⋮ | ⋮ | ⋮ | ⋮ |

FIG. 9A

| Category | Day of week |
|---|---|
| Weekday | Monday, Tuesday, Wednesday, Thursday, Friday |
| Day off | Saturday, Sunday, Holiday |

FIG. 9B

| Category | Period of time |
|---|---|
| Late night | 0 a.m. to 6 a.m. |
| Morning | 6 a.m. to 12 p.m. |
| Afternoon | 12 p.m. to 6 p.m. |
| Evening | 6 p.m. to 0 a.m. |

FIG. 27

The number of
occurrences of
travel pattern 35 times ( LM151 , LM152 )

28 times ( LM181 , LM182 )

26 times ( LM152 , LM132 )

Sum of the numbers of
occurrences of travel
patterns 82 times

The number of
occurrences of
travel pattern 62 times ( LM151 , LM152 )

8 times ( LM152 , LM132 )

7 times ( LM181 , LM182 )

5 times ( LM171 , LM172 )

FIG. 41

Sum of the numbers of occurrences of travel patterns 109 times

The number of occurrences of travel pattern 35 times ( LM151 , LM152 )

28 times ( LM181 , LM182 )

26 times ( LM152 , LM132 )

20 times ( LM171 , LM172 )

TRAVEL PLAN PRESENTING APPARATUS AND METHOD THEREOF

TECHNICAL FIELD

The present invention relates to a travel plan presenting apparatus that predicts a destination of a mobile object and displays predicted information in a highly user-friendly manner, and a method thereof, in a mobile terminal loaded in a vehicle or carried by a user.

BACKGROUND ART

The method for displaying plural information such as the names of destinations, facilities, and the like has been proposed as a method for predicting a destination of a mobile object, either a vehicle or a user, and displaying predicted plural destinations in a mobile terminal loaded in the vehicle or carried with the user (for example, Patent Reference 1). FIG. 1 is a diagram illustrating a conventional display example of destinations described in Patent Reference 1. In the conventional method for displaying the destinations, as shown in FIG. 1, a display device 26 displays a vehicle position 51, a driving road 52, a predicted destination 54 on a map, along with a list showing information regarding predicted destinations using a information display window 55. This allows a user to know, for instance, an estimated arrival time at a destination.

Patent Reference 1: Japanese Unexamined Patent Application Publication No. 2003-57049

DISCLOSURE OF INVENTION

Problems that Invention is to Solve

When a user tries to go from a current position to destinations, there is a case where the user has a fixed order to visit the destinations. For example, there is a case where the user stops by a convenience store to buy breakfast on a way to a workplace. In this case, the user cannot change the order to visit the convenience store and the workplace. On the other hand, there are many cases where it does not matter which order the user visits the destinations. For instance, there is a case where it does not matter whether the user goes to Supermarket A and then Supermarket B or vice versa. In the case where the order can be changed as mentioned above, the user desires to know an order in which the user can visit destinations in the least amount of time in consideration of road conditions such as a traffic jam or to know how much time it takes to go to the destinations.

Further, the significance of the order to visit the destinations differs from user to user. For example, a route which starts from a home to Supermarket A and Supermarket B and ends at the home will be considered. Although a user can change the order to visit Supermarket A and Supermarket B, there are cases where another user prefers to goes first to Supermarket B and then to Supermarket A because of a positional relationship between Supermarket A, Supermarket B, a home of the user, and roads (e.g., when the user is driving a car, whether the user turns right or left to enter each of the facilities).

The conventional structure, however, only list displays each of pieces of information regarding the predicted destination. For this reason, when a mobile object travels over destinations, there is an issue that a user cannot know an order in which the user can visit the destinations in the least amount of time in consideration of the significance of the order for each of the users or know how much time it takes to go to each destination.

In response, the present invention has been conceived to solve the above conventional problem, and has an objective of providing a travel plan presenting apparatus that displays, in the case where a mobile object travels over destinations, an order in which the mobile object can visit the destinations in the least amount of time and estimated arrival times when following the order, so as to present a travel plan in a highly user-friendly manner, and a method thereof.

Means to Solve the Problems

In order to achieve the above objective, a travel plan presenting apparatus according to the present invention includes: a travel pattern extracting unit which retrieves, as travel patterns, sets of pieces of travel history information each including a current position and the final arrival place, from pieces of travel history information of a mobile object each being accumulated in a travel history accumulation unit and regarding a travel from a departure place to an arrival place, extracts at least one travel pattern from the retrieved travel patterns, and, in the case where a travel pattern in which an order of halfway arrival places other than the final arrival place included in the extracted travel pattern has been changed exists in the pieces of travel history information of the mobile object, further extracts the travel pattern in which the order of the arrival places has been changed; a travel plan calculating unit which calculates, for each of the extracted travel patterns, estimated arrival times at the final arrival place and each of the arrival places included in a corresponding one of the travel patterns extracted by the travel pattern extracting unit; and a display processing unit which generates display information for displaying, on the same screen, for each extracted travel pattern, the estimated arrival time at each arrival place that has been calculated by the travel plan calculating unit, and displays the display information on the screen.

It is to be noted that the present invention can be realized not only as the travel plan presenting apparatus but also as the method thereof having steps for performing the function similar to the apparatus and as a program causing a computer to execute the method. It is also to be noted that such a program can be distributed via recording media such as a CD-ROM and transmission media such as the Internet.

DISCLOSURE OF INVENTION

The travel plan presenting apparatus and the method thereof according to the present invention enable the user trying to travel over the destinations to compare effective routes from the viewpoint of required time by presenting plural orders to visit the destinations.

BRIEF DESCRIPTION OF DRAWINGS

FIG. 3A is a diagram illustrating an example of node data in map data stored in a storage unit according to the first embodiment.

FIG. 3B is a diagram illustrating an example of interpolation node data in the map data stored in the storage unit according to the first embodiment.

FIG. 3C is a diagram illustrating an example of link data in the map data stored in the storage unit according to the first embodiment.

FIG. 5A is a diagram illustrating an example of facility data in landmark data stored in the storage unit according to the first embodiment.

FIG. 5B is a diagram illustrating an example of user-set data in the landmark data stored in the storage unit according to the first embodiment.

FIG. 6 is a diagram illustrating an example of travel histories stored in the storage unit according to the first embodiment.

FIG. 9A is a diagram illustrating a table for categorizing a current date and time into a day of the week according to the first embodiment.

FIG. 9B is a diagram illustrating a table for categorizing a current date and time into a period of time according to the first embodiment.

FIG. 27 is a schematic view illustrating an example of sets of arrival places according to the third embodiment.

FIG. 38 is a schematic view illustrating an example of sets of arrival places according to the fifth embodiment.

FIG. 41 is a schematic view illustrating an example of sets of arrival places according to the fifth embodiment.

NUMERICAL REFERENCES

Figure 1:
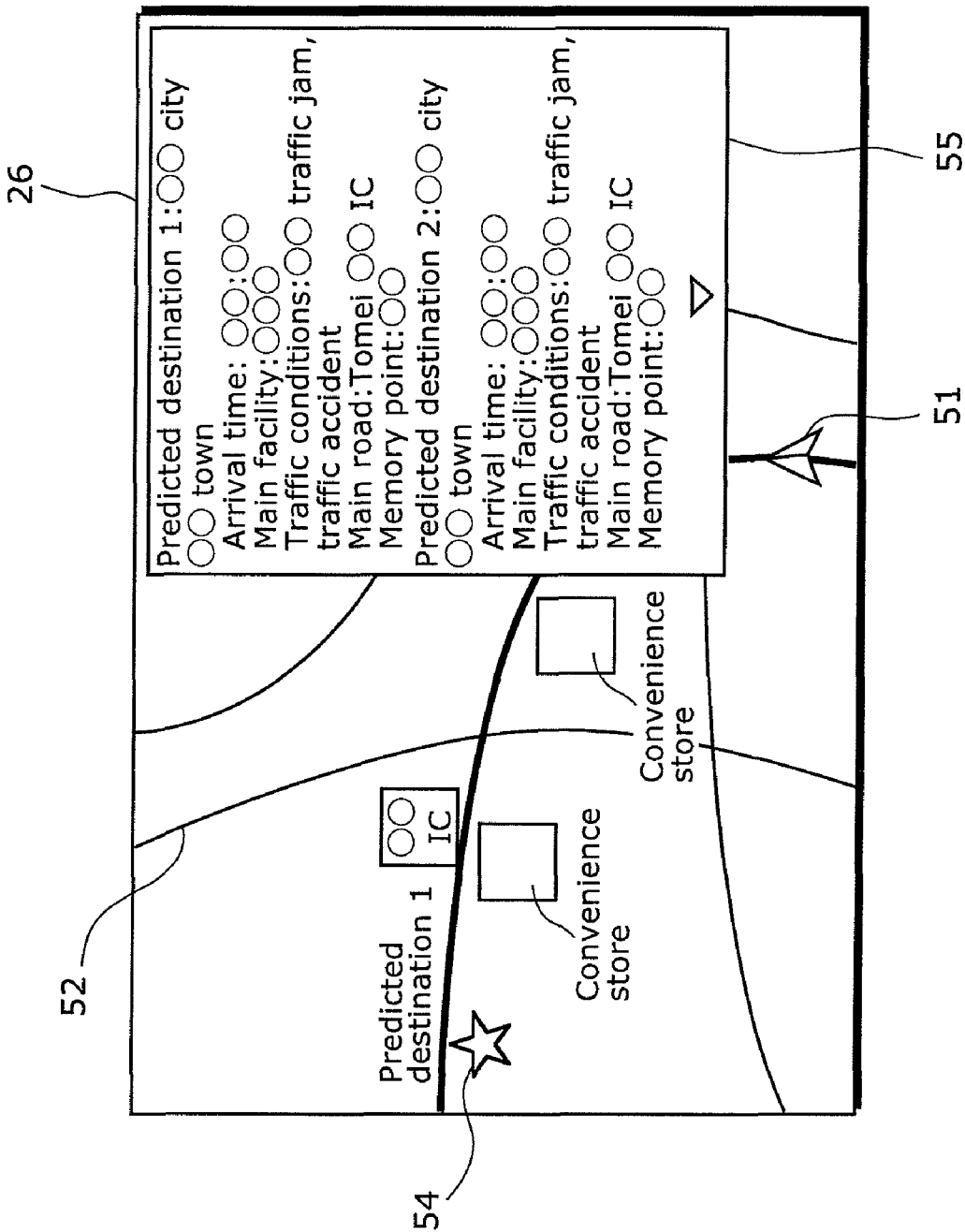
FIG. 1 is a diagram illustrating a conventional display example of destinations.

| | |
|---|---|
| 101, 201, 301, 401, 501 | Car navigation apparatus |
| 102 | Position obtaining unit |
| 103 | Date and time obtaining unit |
| 104 | Storage unit |
| 105 | Control unit |
| 106 | Display unit |
| 107 | Map database |
| 108 | Landmark database |
| 109 | Travel history accumulation unit |
| 110 | Data management unit |
| 111 | Matching unit |
| 112 | Travel pattern extracting unit |
| 113 | Travel plan calculating unit |
| 114 | Display processing unit |
| 115 | Stay time calculating unit |
| 207 | Input unit |
| 212 | Travel pattern extracting unit |
| 214 | Display processing unit |
| 312 | Travel pattern extracting unit |
| 314 | Display processing unit |
| 416 | Destination specifying unit |
| 417 | Stop extracting unit |
| 512 | Travel pattern extracting unit |
| 514 | Display processing unit |

BEST MODE FOR CARRYING OUT THE INVENTION

A travel plan presenting apparatus according to embodiments of the present invention includes: a travel history accumulation unit which accumulates travel histories regarding a travel of a mobile object from a departure place to an arrival place; a travel pattern extracting unit which retrieves, as travel patterns, travel histories each including a current position and travel histories each geographically continuing from a corresponding one of the travel histories including the current position to the final arrival place, from travel histories of the mobile object accumulated in the travel history accumulation unit, extracts at least one travel pattern from the retrieved travel patterns, and, in the case where a travel pattern in which an order of halfway arrival places other than the final arrival place included in the extracted travel pattern has been changed exists in the travel histories of the mobile object, also further extracts the travel pattern in which the order of the arrival places has been changed; a travel plan calculating unit which calculates, for each of the extracted travel patterns, estimated arrival times at the final arrival place and each of the arrival places included in a corresponding one of the travel patterns extracted by the travel pattern extracting unit; and a display processing unit which generates display information for displaying, on the same screen, for each extracted travel pattern, the estimated arrival time at each arrival place that has been calculated by the travel plan calculating unit, and displays the display information on the screen.

With this structure, travel patterns which a user is likely to choose are predicted, and travel patterns in each of which an order of arrival places has been changed and an estimated arrival time at each arrival place can be presented even for a travel over the arrival places.

Here, the travel pattern extracting unit may retrieve, as travel patterns, travel histories each including a current position and travel histories each geographically continuing from a corresponding one of the travel histories including the current position to the final arrival place, from the travel histories accumulated in the travel history accumulation unit; extract, from the retrieved travel patterns, a predetermined number of travel patterns in descending order of the number of occurrences; and, in the case where a travel pattern in which an order of halfway arrival places included in a corresponding one of the extracted travel patterns has been changed exists in the travel histories, extract the travel pattern in which the order of the arrival places has been changed.

Furthermore, the travel pattern extracting unit may retrieve, as travel patterns, travel histories each including a current position and travel histories each geographically continuing from a corresponding one of the travel histories including the current position to the final arrival place, from the travel histories accumulated in the travel history accumulation unit; categorize each of the retrieved travel patterns into a set of arrival places included in a corresponding one of the travel patterns; extract a travel pattern including a set of arrival places to be selected by a user from the categorized sets of the arrival places; and, in the case where a travel pattern in which an order of halfway arrival places other than the final arrival place included in the extracted travel pattern has been changed exists in the travel histories, further extract the travel pattern in which the order of the arrival places has been changed. The display processing unit may further generate display information for displaying the sets of the arrival places categorized by the travel pattern extracting unit, and display the display information on a screen. The travel plan presenting apparatus may further include an input unit which receives from the user a selection of one of the sets of the arrival places that are included in the display information generated by the display processing unit.

Moreover, the travel pattern extracting unit may retrieve, as travel patterns, travel histories each including a current position and travel histories each geographically continuing from a corresponding one of the travel histories including the current position to the final arrival place, from the travel histories accumulated in the travel history accumulation unit; categorize each of the retrieved travel patterns into a set of arrival places included in a corresponding one of the travel patterns; calculate a ratio of the largest number of occurrences of a set of arrival places to a sum of the numbers of occurrences of the sets of the arrival place; in the case where the ratio is equal to or greater than a predetermined value, extract, from the retrieved travel patterns, a predetermined number of travel patterns in descending order of the number of occurrences; in the case where the ratio is less than the predetermined value, extract a travel pattern including a set of arrival places to be selected by a user from the categorized sets of the arrival places; and, in the case where a travel pattern in which an order of halfway arrival places other than the final place included in the extracted travel pattern has been changed exists in the travel histories, further extract the travel pattern in which the order of the arrival places has been changed. In the case where the ratio is less than the predetermined value, the display processing unit may further generate display information for displaying the sets of the arrival places categorized by the travel pattern extracting unit, and display the display information on a screen. The travel plan presenting apparatus may further include an input unit which receives, in the case where the ratio is less than the predetermined value, from the user a selection of one of the sets of the arrival places that are included in the display information generated by the display processing unit.

With these structures, it is possible to judge from travel histories whether or not an order to visit arrival places is regarded important, and extraction methods for extracting travel patterns can be selectively used depending on whether or not the order to visit the arrival places is regarded important.

In addition, only in the case where the estimated arrival time at the final arrival place of the travel pattern which is extracted by the travel pattern extracting unit and in which the order of the arrival places has been changed is earlier than an estimated arrival time at the final arrival place of the travel pattern in which the order of the halfway arrival places has not been changed, the display processing unit may generate, as display information, an estimated arrival time at each of the final and halfway arrival places included in the travel pattern in which the order of the arrival places has been changed and the travel pattern in which the order of the arrival places has not been changed, and display the display information on a screen.

With this structure, except a travel pattern having an order of arrival places that has never been chosen, travel patterns can be presented.

Furthermore, the display processing unit may further generate the display information so that a mode of displaying is different for a set of halfway arrival places of which an order is to be changed by the travel pattern extracting unit and for arrival places other than the set of the arrival places, and display the display information on the screen.

Moreover, the display processing unit may generate, as display information, information for displaying with a common icon each of the arrival places other than the set of the halfway arrival places of which the order is to be changed, information indicating a branch from an arrival place immediately previous to the set of the halfway arrival places of which the order is to be changed to the first arrival places in the set of the halfway arrival places of which the order is to be changed, information indicating a junction from the last arrival places in the set of the halfway arrival places of which the order is to be changed to an arrival place immediately after the set of the halfway arrival places of which the order is to be changed, and information for displaying the estimated arrival time at each arrival place; and display the display information, the arrival places other than the set of the halfway arrival places and the set of the halfway arrival places being included in the travel pattern in which the order has been changed and the travel pattern in which the order has not been changed.

With this structure, the user can immediately find, from travel routes, arrival places of which respective orders are to be changed.

In addition, the travel plan presenting apparatus may further include a destination specifying unit which receives from a user a specification of a destination. The travel pattern extracting unit may extract, from travel histories accumulated in the travel history accumulation unit, a stop that can be reached within a predetermined time from the destination received by the destination specifying unit; retrieve, as travel patterns, travel histories each including a current position, the destination, and the stop and travel histories each geographically continuing from a corresponding one of the travel histories including the current position to the final arrival place; and extract at least one travel pattern from the retrieved travel patterns.

The following will describe each of embodiments of the present invention with reference to the drawings.

First Embodiment

Figure 2:
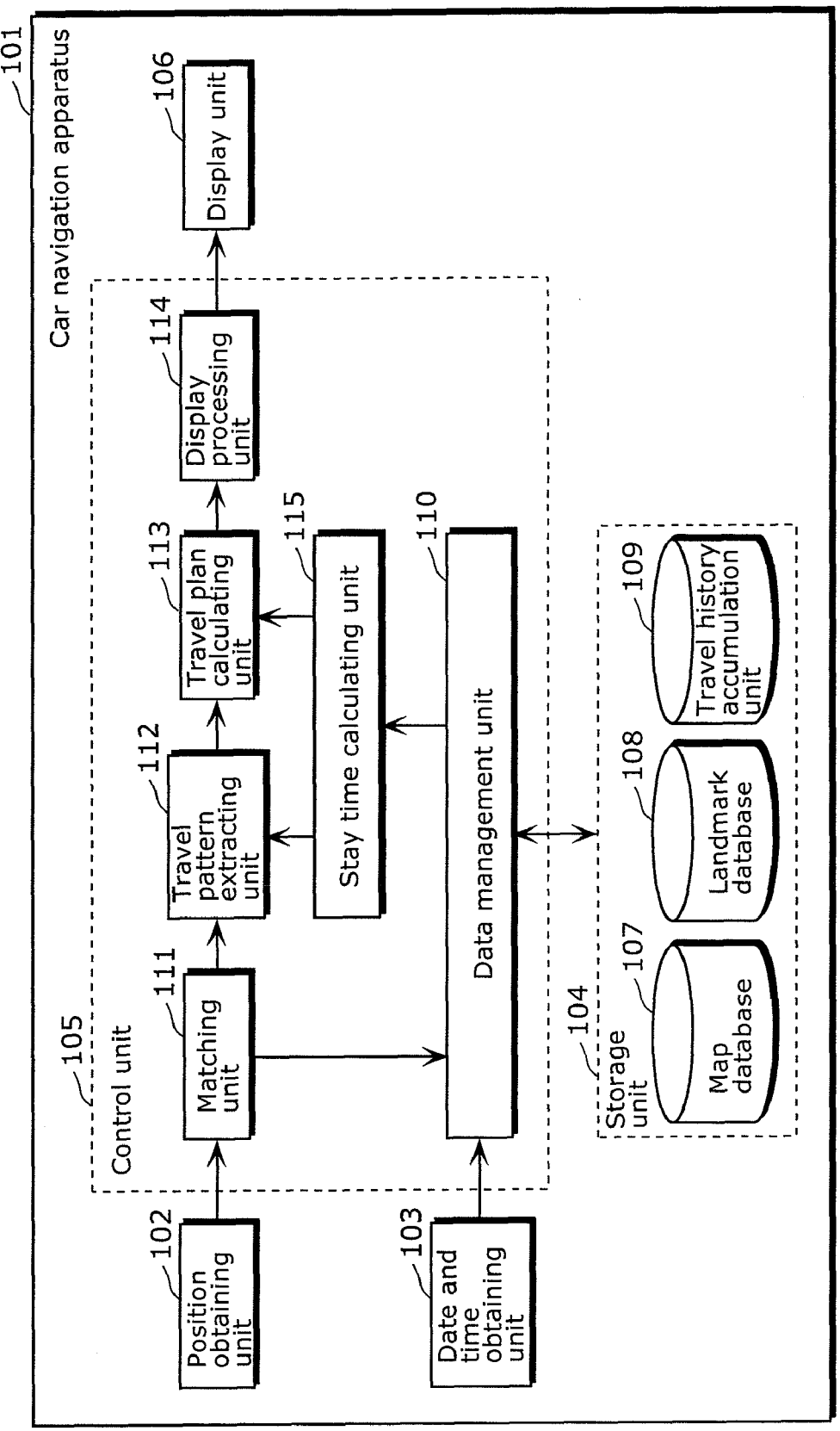
FIG. 2 is a functional block diagram of a travel plan presenting apparatus according to a first embodiment.

A first embodiment will describe an example where a travel plan presenting apparatus according to the present invention is applied to a car navigation apparatus to be loaded in a car. FIG. 2 is a functional block diagram illustrating a structure of the car navigation apparatus to which the travel plan presenting apparatus is applied according to the present embodiment.

A car navigation apparatus 101 is an apparatus for predicting arrival places that are to be destinations and displaying an estimated arrival time at each arrival place in each of cases where an order to visit the destinations has been changed. As shown in FIG. 2, the car navigation apparatus 101 includes a position obtaining unit 102, a date and time obtaining unit 103, a storage unit 104, a control unit 105, and a display unit 106.

The position obtaining unit 102 is attached to a vehicle in which the car navigation apparatus 101 is loaded. The position obtaining unit 102 is a processing unit that obtains position information, such as latitude and longitude, of a current position at predetermined time intervals, for example, at one second intervals, and includes, for instance, a global positioning system (GPS) receiver, or a vehicle speed sensor, an angular speed sensor, and an acceleration sensor.

The date and time obtaining unit 103 is a device that detects a current date and time, and is, for instance, a clock with calendar or the GPS receiver.

The storage unit 104 includes a map database 107, a landmark database 108, and a travel history accumulation unit 109, and is specifically an optical recording medium such as a hard disk drive (HDD) and a DVD-ROM (Read Only Memory) and a recording medium such as a flash memory and a SD memory card.

Figure 4:
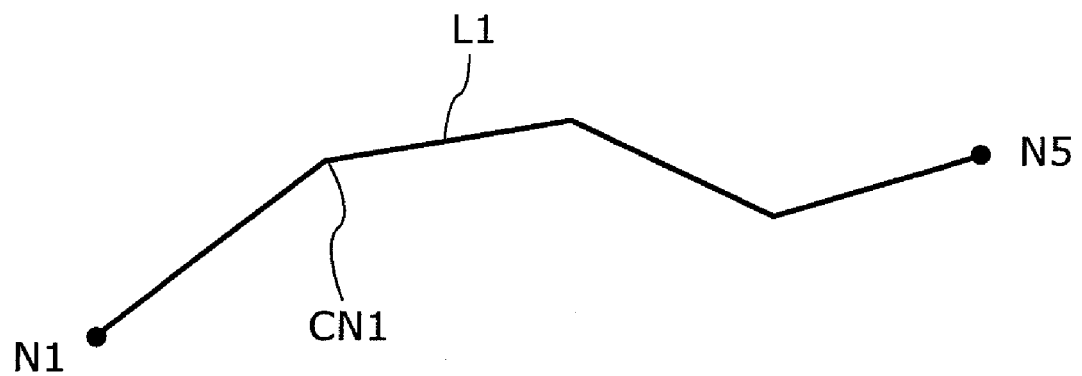
FIG. 4 is a schematic view illustrating an example of map data according to the first embodiment.

FIGS. 3A to 3C are diagrams each illustrating an example of map data stored in the map database 107, and FIG. 4 is a diagram schematically illustrating the map data shown in FIGS. 3A to 3C. The map database 107 includes node data, interpolation node data, and link data. The node data indicates a point (e.g., nodes N1 and N5 shown in FIG. 4) where a road branches off in several directions such as an intersection or a junction as shown in FIG. 3A, and includes position information of each of nodes such as latitude and longitude, and the number of connection links to and a connection link ID for the node that is to be described. The interpolation node data exists on a link to be described as shown in FIG. 3B, indicates a bending point (e.g., bending point CN1 shown in FIG. 4) that represents a shape of the link in the case where the link is not linear but bended, and includes position information such as latitude and longitude and a link ID to which the interpolation data belongs. The link data indicates a road (e.g., road L1 shown in FIG. 4) linking a node to another node as shown in FIG. 3C, and includes an initial node and a terminal node that are end points of a link, a length of the link (road length), a width of the link (road width), a road category such as a general road and a highway, the number of interpolation nodes, and an interpolation node ID.

FIGS. 5A and 5B are diagrams each illustrating an example of landmark data stored in the landmark database 108. The landmark database 108 includes facility data and user-set data. The facility data indicates landmarks registered by information service providers as shown in FIG. 5A, and includes a category, a name, an ID, and position information, such as latitude and longitude, of each landmark. The user-set data indicates landmarks registered by a user oneself as shown in FIG. 5B, and includes a name, an ID, and position information, such as latitude and longitude, of each landmark. The user can register landmark names recognizable to the user oneself, such as "home" or "workplace", with the user-set data.

FIG. 6 is a diagram illustrating an example of travel histories accumulated in the travel history accumulation unit 109. A travel history of a vehicle is accumulated for every driving in the travel history accumulation unit 109, and a departure place, an arrival place, link IDs of routes between the places in one driving are chronologically accumulated as a travel history. The departure place, the arrival place, and the link IDs of the routes between the places are accumulated in association with a departure date and time from each of points of the departure place, the arrival place, and the routes or an arrival date and time at each point. For instance, the first travel history in FIG. 6 indicates that the vehicle departed a departure place having landmark ID LM201 at 8:43 a.m. on Mar. 28, 2007, and arrived at a road having link ID L3 at 8:45 a.m., at a road having link ID L9 at 8:50 a.m., at a road having link ID L12 at 8:56 a.m., and finally at an arrival place having landmark ID LM202 at 9:25 a.m. The departure or arrival of the vehicle can be judged by a start or stop of an engine of the vehicle. It is to be noted that although the driving routes between the departure and arrival places have been described with the example of storing the link IDs of the roads, IDs of passed nodes may be stored.

As shown in FIG. 2, the control unit 105 includes a data management unit 110, a matching unit 111, a travel pattern extracting unit 112, a travel plan calculating unit 113, a display processing unit 114, and a stay time calculating unit 115. The control unit 105 specifically includes a central processing unit (CPU) or a micro processing unit (MPU) that controls the operations of the entire car navigation apparatus 101, and a read only memory (ROM) or a random access memory (RAM).

The data management unit 110 manages other components of the control unit 105 and reception and transmission of data stored in the storage unit 104.

The matching unit 111 refers to map data or landmark data obtained via the data management unit, and performs a map-matching process in which position information obtained by the position obtaining unit 102 is converted into a node ID, a link ID or a landmark ID. The map-matching process is a technology already in practical use for existing car navigation apparatuses. Thus, the description of the map-matching process will be omitted.

The travel pattern extracting unit 112 retrieves, as travel patterns, travel histories that match an ID of a current position converted by the matching unit 111 and a current date and time obtained by the date and time obtaining unit 103 and travel histories that successively link the respective retrieved travel histories to the final arrival place, from travel histories accumulated in the travel history accumulation unit 109, via the data management unit 110, and extracts at least one travel pattern from the retrieved travel patterns. In addition, the travel pattern extracting unit 112 generates travel patterns in each of which an order of arrival places other than the final arrival place included in the retrieved travel pattern has been changed.

The travel plan calculating unit 113 refers to the current date and time obtained by the date and time obtaining unit 103, the map data stored in the map database 107, and the landmark data stored in the landmark database 108, for the travel pattern extracted and the travel patterns generated by the travel pattern extracting unit 112, and calculates, for each travel pattern, an estimated arrival time at each arrival place in the travel patterns.

The display processing unit 114 performs a display process to cause the display unit 106 to display the travel pattern extracted and the travel patterns generated by the travel pattern extracting unit 112 and the estimated arrival times each corresponding to a corresponding one of the travel patterns and being calculated by the travel plan calculating unit 113.

The stay time calculating unit 115 refers to the travel histories accumulated in the travel history accumulation unit 109, and calculates stay characteristics of and an average stay time at each of landmarks.

Figure 7:
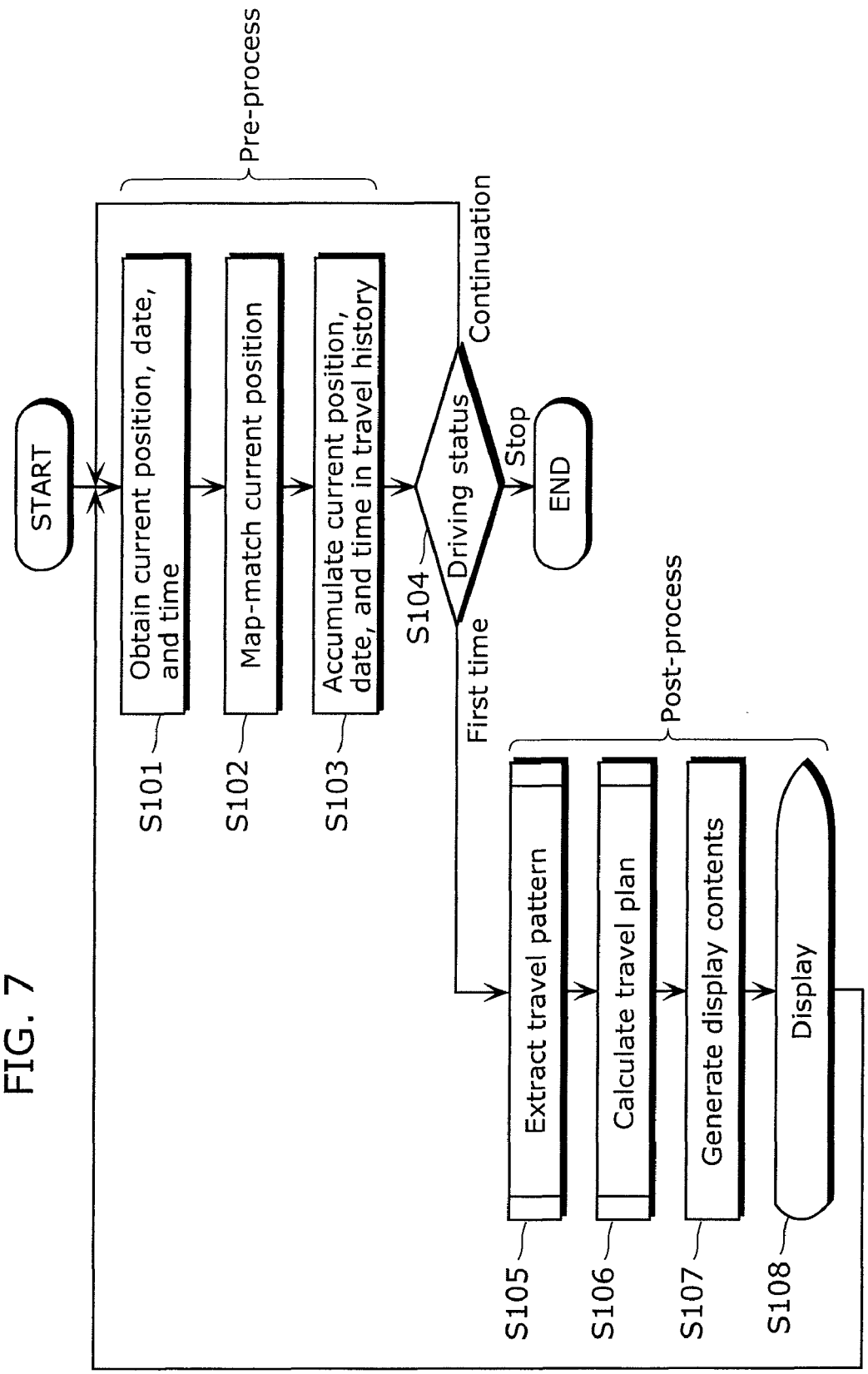
FIG. 7 is a flow chart illustrating a process flow according to the first embodiment.

Next, the operations of the car navigation apparatus 101 to which the travel plan presenting apparatus according to the present embodiment that is structured as mentioned above is applied will be described using the flow chart of FIG. 7. FIG. 7 is the flow chart illustrating the operation flow of the car navigation apparatus 101.

A start of an engine of a vehicle in which the car navigation apparatus 101 is loaded activates the car navigation apparatus 101.

The position obtaining unit 102 obtains position information, such as latitude and longitude, of a current position, and the date and time obtaining unit 103 obtains a current date and time (S101).

The matching unit 111 performs a map-matching process to convert the position information obtained by the position obtaining unit 102 into a node ID, a link ID or a landmark ID (S102).

The data management unit 110 associates the ID of the current position converted by the matching unit 111 with the current date and time obtained by the date and time obtaining unit 103, and causes the travel history accumulation unit 109 to store the ID of the current position associated with the current date and time as a travel history (S103). As a result, the travel histories as shown in above-mentioned FIG. 6 are accumulated. As shown in FIG. 6, each travel history is accumulated as a log recorded from when the vehicle starts moving to when the vehicle stops moving.

The control unit 105 judges a driving status of the vehicle (S104). In the case where it is judged by the stop of the engine of the vehicle that the vehicle has stopped moving (Stop at S104), the travel plan presenting apparatus ends the process. In the case where it is judged by the engine operation of the vehicle that the vehicle has been moving and where the driving status judgment process (S104) is performed after the second time (Continuation in S104), the step returns to the position, date, and time obtaining process (S101).

In the case where it is judged that the vehicle has been moving and where the driving status judgment process (S104) is performed for the first time (First time in S104), the travel pattern extracting unit 112 extracts travel histories that match the ID of the current position converted by the matching unit 111 and the current date and time obtained by the date and time obtaining unit 103, and extracts, as travel patterns including the extracted travel histories and travel histories that successively link the respective extracted travel histories to the final arrival place, a predetermined number of travel patterns in descending order of the number of occurrences of each travel pattern (S105). The present step will be described in detail below.

Here, an arrival place is a landmark where the vehicle is brought to a stop, and a travel pattern is a collection of only arrival places extracted in consideration of an order relation.

The travel plan calculating unit 113 refers to the current date and time obtained by the date and time obtaining unit 103, the map data stored in the map database 107, and the landmark data stored in the landmark database 108, for the travel patterns extracted by the travel pattern extracting unit 112, and calculates, for each travel pattern, an estimated arrival time at each arrival place in the travel patterns (S106). The present step will be described in detail below.

The display processing unit 114 performs a display process to cause the display unit 106 to display the travel patterns extracted by the travel pattern extracting unit 112 and the estimated arrival times each corresponding to a corresponding one of the travel patterns and being calculated by the travel plan calculating unit 113 (S107).

The display unit 106 displays display information generated by the display processing unit 114 for a user (S108). After displaying the travel patterns and the estimated arrival times for a certain period of time, the display unit 106 may display a normal screen page of a car navigation apparatus or keep the travel patterns and the estimated arrival times displayed until a user operation for changing the screen page is performed.

Figure 8:
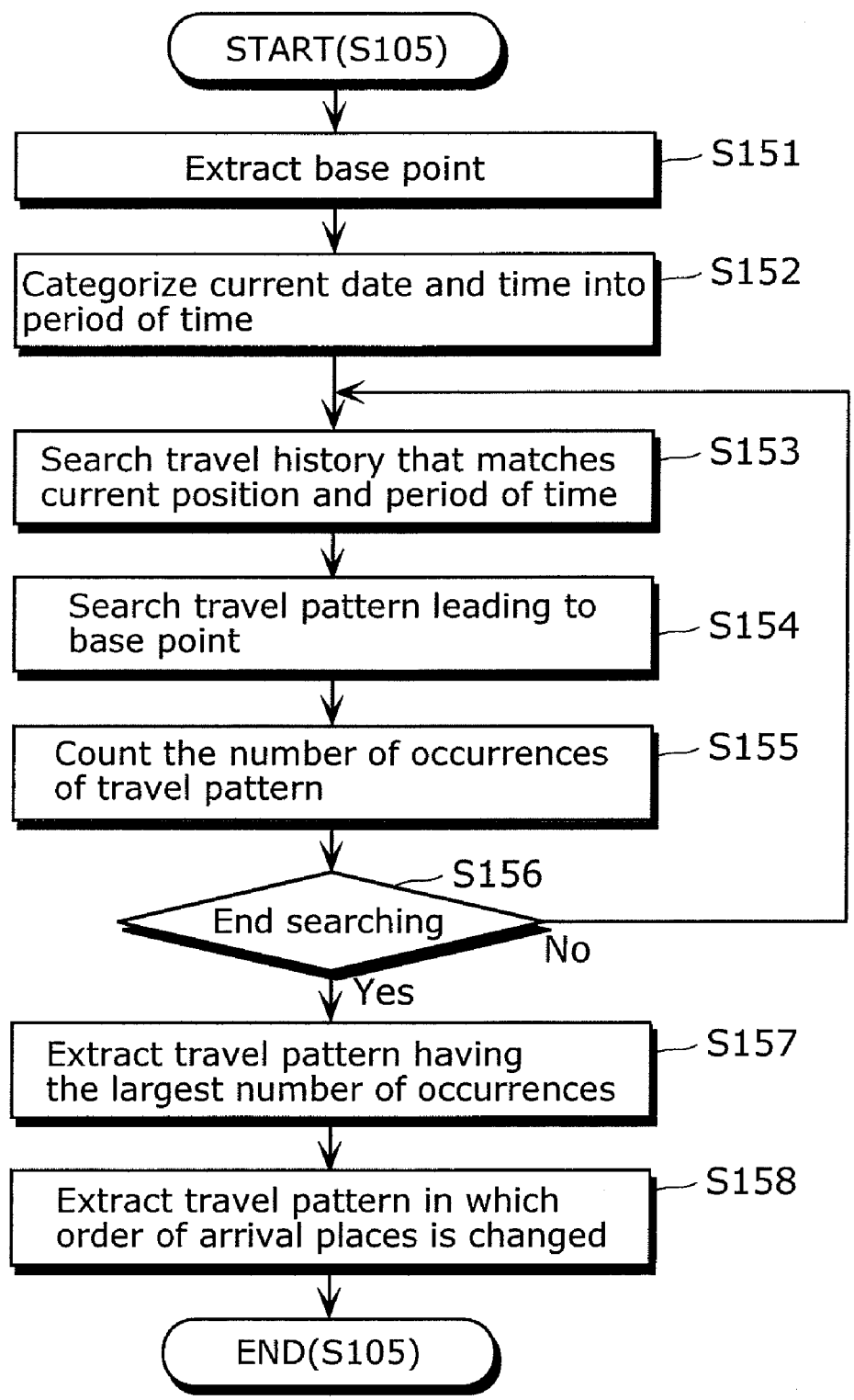
FIG. 8 is a flow chart illustrating a detailed process flow of an extraction process for travel patterns according to the first embodiment.

The above-mentioned travel pattern extracting process (S105) will be described in detail using the flow chart of FIG. 8. FIG. 8 is the flow chart illustrating an extraction process for travel patterns.

The stay time calculating unit 115 refers to the travel histories accumulated in the travel history accumulation unit 109, and extracts a place where the user is highly likely to stay for a long time (S151). The place is called a base point here, and examples of the base point include a home, a workplace, and a school. As a method for extracting the base point, for example, a place where the number of days the user stayed for equal to or longer than a predetermined time (e.g., 6 hours) accounts for equal to or more than a predetermined ratio (e.g., 50%) in the number of all history days may be extracted as a base point. In addition, a place where an amount of time the user stayed that is equal to or longer than a predetermined time (e.g., 6 hours) accounts for equal to or more than a predetermined ratio (e.g., 50%) in the entire amount of stay time may be extracted as a base point.

The travel pattern extracting unit 112 categorizes the current date and time obtained by the date and time obtaining unit 103 into a day of the week and a period of time (S152). The categorization is performed by referring to a table for categorizing a current date into a day of the week as shown in FIG. 9A and a table for categorizing a time into a period of time as shown in FIG. 9B. For instance, a current date and time is "8:30 a.m., Friday, Mar. 30, 2007", the current date and time is categorized into "weekday morning" according to the FIGS. 9A and 9B.

The travel pattern extracting unit 112 retrieves, from the travel histories accumulated in the travel history accumulation unit 109, a travel history in which a mobile object departed from a point having an ID on a day of the week and in a period of time that are identical to the day of the week and the period of time categorized through the categorization process (S152), the ID being the same as the ID of the current position converted by the matching unit 111 (S153). In the case where sufficient travel histories are accumulated, one or more such travel histories are naturally found. In the case where sufficient travel histories are not accumulated and where such travel history is not found, the step returns to the position, date, and time obtaining process (S101 in FIG. 7) without performing subsequent processes.

The travel pattern extracting unit 112 extracts, from the travel history accumulation unit 109, travel histories continuing the travel history found through the travel history retrieving process (S153) as a travel pattern (S154). The continuous travel histories are travel histories in which a departure place is an arrival place of a reference travel history (here, the travel history found through the travel history retrieving process (S153)). Although the travel histories are always continuous, continuous travel histories that lead to the base point extracted through the base point extraction process (S151) are a travel pattern. This is for processing a travel to the base point as an end of the travel.

For instance, in the example of the travel histories in FIG. 6, when base points are a landmark having landmark ID LM201 and a landmark having landmark ID LM202, respectively, since an arrival place is one of the base points in the first travel history, the second travel history does not follow the first travel history. In addition, since an arrival place is the other base point in the second travel history, the third travel history does not follow the second travel history. On the other hand, since an arrival place is landmark LM101 that is not the base point in the third travel history, the fourth travel history in which a departure place is the landmark LM101 follows the third travel history.

Figure 10:
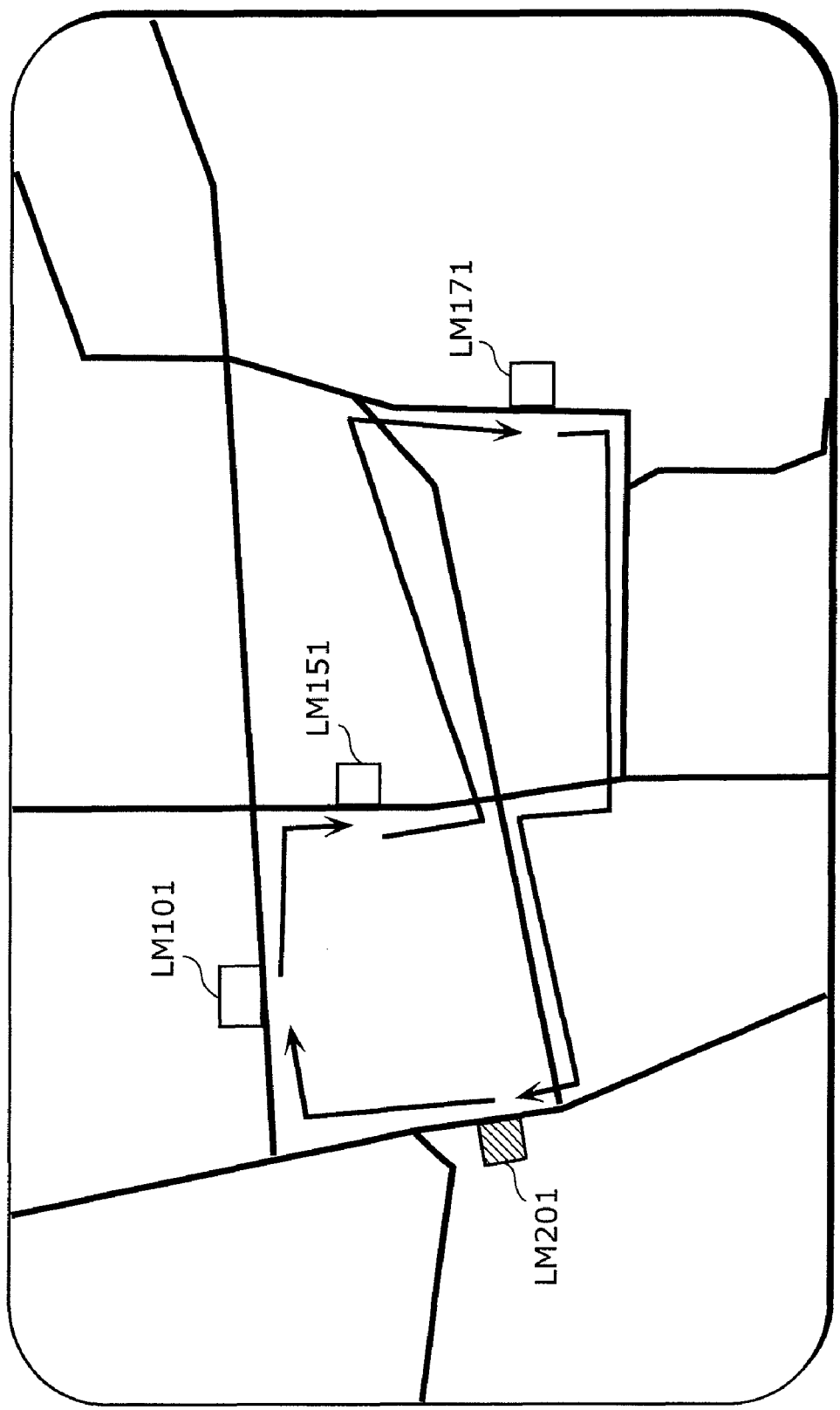
FIG. 10 is a diagram illustrating an example of a travel pattern on a map according to the first embodiment.

Furthermore, in the case where the travel history found through the travel history retrieving process (S153) performed by the travel pattern extracting unit 112 is the third travel history shown in FIG. 6, the third to sixth travel histories shown in FIG. 6 are, for example, geographically continuous travel histories leading to base point LM201 each of which represents a corresponding one of travels from the base point LM201 to arrival place LM101, from the arrival place LM101 to arrival place LM151, from the arrival place LM151 to arrival place LM171, and from the arrival place LM171 to the base point LM201 as shown in FIG. 10. In this case, the travel pattern extracting unit 112 extracts the third to sixth travel histories shown in FIG. 6 as a travel pattern.

Next, the travel pattern extracting unit 112 organizes the continuous travel histories into one travel pattern. In this case, only a departure place and an arrival place are included in the travel pattern, and routes between the places are not used.

Figure 11:
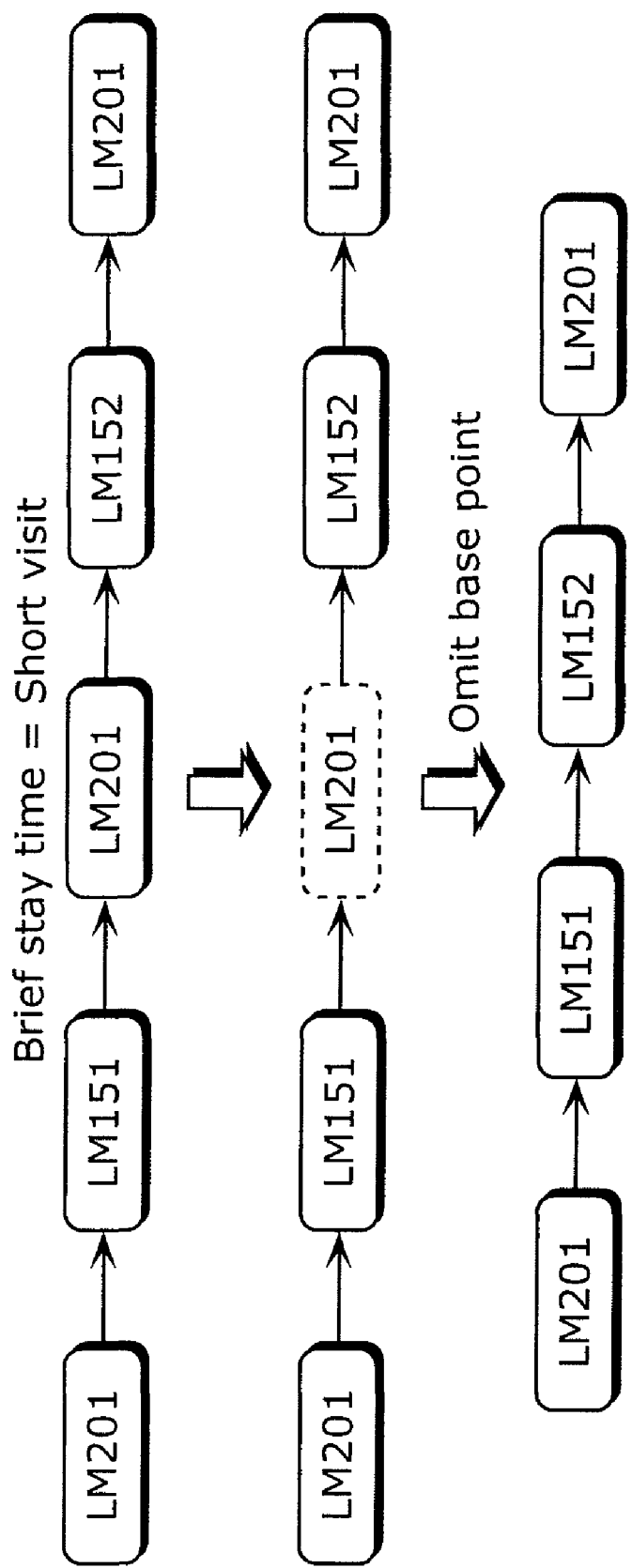
FIG. 11 is a schematic view illustrating generation of a travel pattern from which a base point is omitted according to the first embodiment.

It is to be noted that although the travel histories continuous from the current position to the base point are organized into the travel pattern, in the case where a stay time at the base point is equal to or shorter than a predetermined time (e.g., 30 minutes) in a travel history in which a base point is an arrival place, it is considered that only a short visit at the base point is made for simply leaving or fetching a bag. The base point is omitted accordingly, and connecting arrival places before and after the base point is considered to form a travel pattern. FIG. 11 illustrates an example of this process. Although LM201 in the middle of the travel pattern is a base point in FIG. 11, since the stay time is short, the base point is omitted, and connecting the arrival places forms the travel pattern.

When the travel pattern organized through the travel pattern retrieving process (S154) has been found in the travel histories accumulated in the travel history accumulation unit 109, the travel pattern extracting unit 112 adds 1 to a count of the travel pattern, and when not found, the travel pattern extracting unit 112 sets the count to 1 (S155). In this manner, the travel pattern extracting unit 112 counts the number of occurrences of each of travel patterns.

The travel pattern extracting unit 112 retrieves all of the travel histories accumulated in the travel history accumulation unit 109 to extract the travel patterns, and judges whether or not counting the number of occurrences of each travel pattern is completed (S156). In the case where the above process has not been completed (No in S156), the step returns to the travel history retrieving process (S153).

Figure 12:
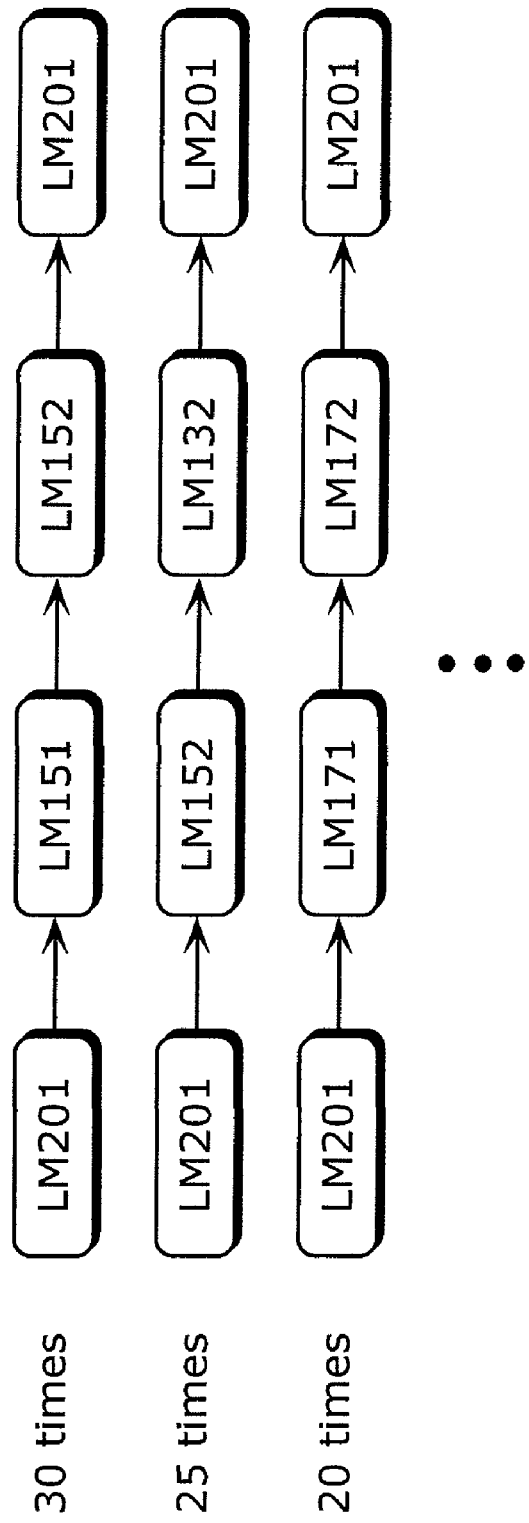
FIG. 12 is a schematic view illustrating an example of travel patterns according to the first embodiment.

In the case where the above process is completed (Yes in S156), the travel pattern extracting unit 112 extracts a travel pattern having the largest number of occurrences that is counted in the counting process (S155) (S157). FIG. 12 schematically illustrates travel patterns each having the number of occurrences counted. In FIG. 12, since the first travel pattern has the largest number of occurrences, the first travel pattern is extracted.

Figure 13:
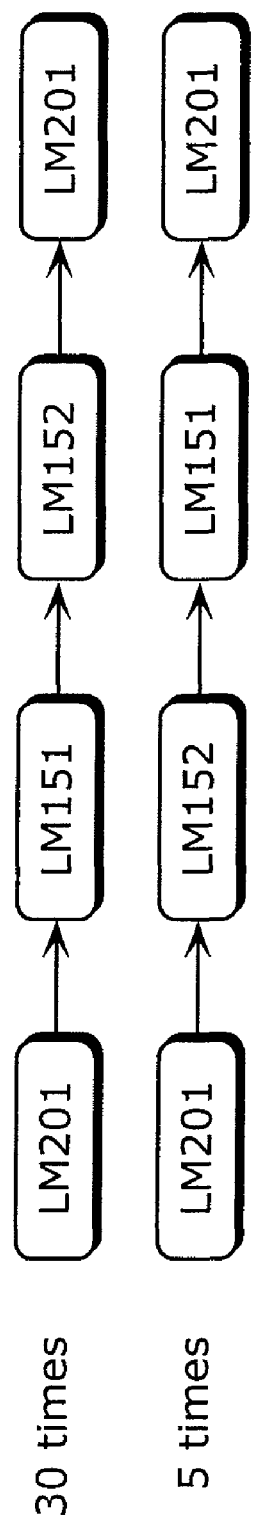
FIG. 13 is a schematic view illustrating a change of an order of arrival places in a travel pattern according to the first embodiment.

The travel pattern extracting unit 112 judges whether there is changeability in the travel pattern extracted through the travel pattern extraction process (S157), and extracts travel patterns in each of which an order of arrival places has been changed, when it is judged that there is the changeability (S158). Specifically, when the travel patterns in each of which the order of the arrival places in the extracted travel pattern has been changed are accumulated in the travel history accumulation unit 109, it is judged that there is the changeability, and the travel pattern extracting unit 112 extracts, from the travel history accumulation unit 109, the travel patterns in each of which the order of the arrival places has been changed. For instance, when there are two arrival places except a departure place and the final arrival place in a travel pattern, remaining combination of travel patterns in each of which an order of the arrival places has been changed is 1 (=2!−1), and when there are three arrival places except a departure place and the final arrival place in a travel pattern, remaining combination of travel patterns in each of which an order of the arrival places has been changed is 5 (=3!−1). When the travel patterns in each of which the order of the arrival places has been changed are accumulated in the travel history accumulation unit 109, the travel pattern extracting unit 112 extracts the travel patterns in each of which the order of the arrival places has been changed. When the number of the extracted travel patterns is larger than a predetermined number, the travel pattern extracting unit 112 extracts the predetermined number of the travel patterns in descending order of the number of occurrences. Although the predetermined number is 3 in consideration of displaying the travel patterns on a screen of the car navigation apparatus, the predetermined number is not limited to 3. FIG. 13 schematically illustrates the present step. In FIG. 13, the second travel pattern is a travel pattern in which an order of arrival places in the first travel pattern has been changed, and is a travel pattern extracted from travel histories.

Figure 14:
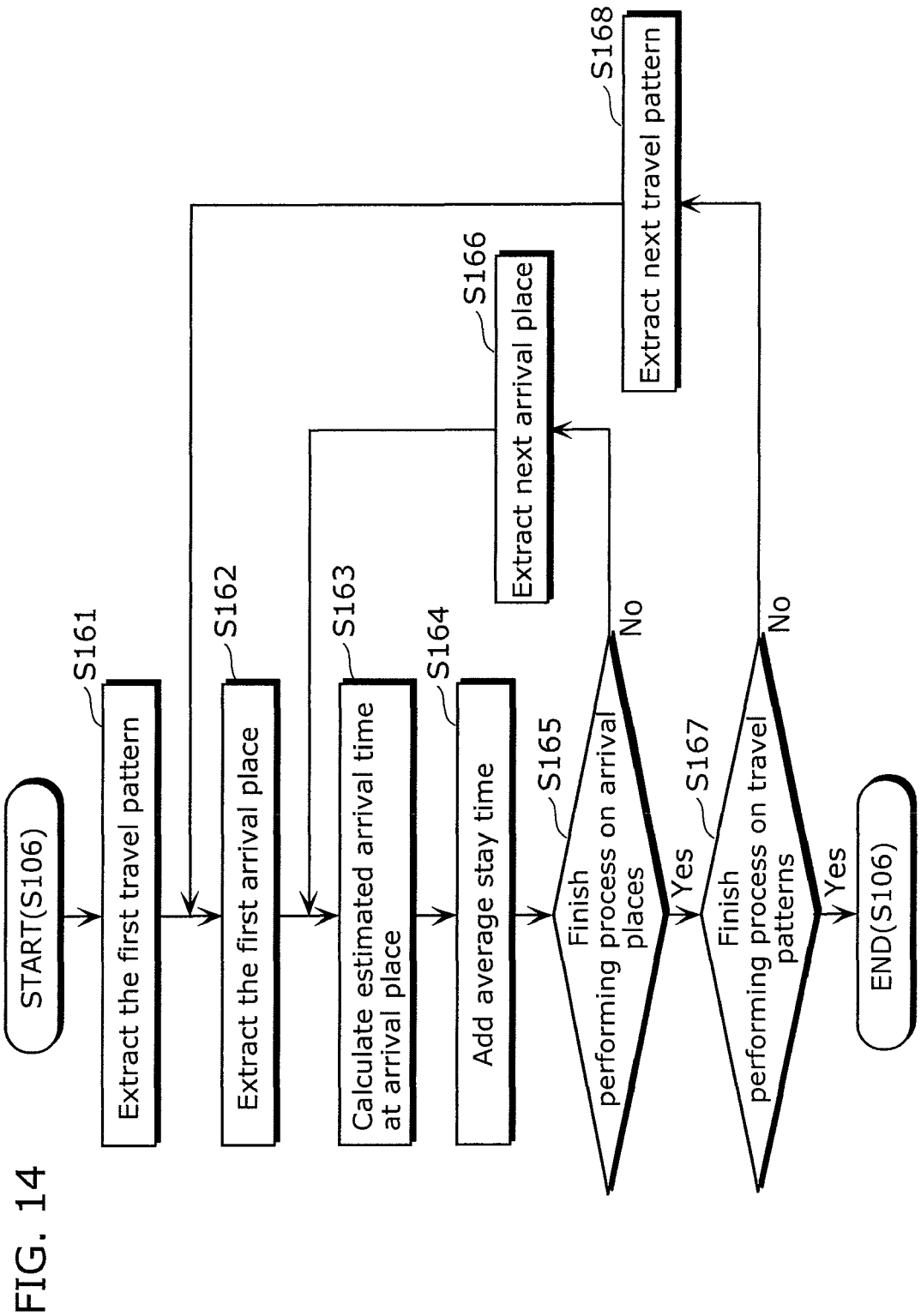
FIG. 14 is a flow chart illustrating a detailed process flow of a travel plan calculation process for travel plans according to the first embodiment.

Next, the above-mentioned travel plan calculation process (S106 in FIG. 7) will be described in detail using the flow chart of FIG. 14. FIG. 14 is the flow chart illustrating a flow of the travel plan calculation process.

The travel plan calculating unit 113 extracts the first travel pattern from the travel patterns extracted by the travel pattern extracting unit 112 (S161).

The travel plan calculating unit 113 extracts the first arrival place from the first travel pattern extracted through the first travel pattern extraction process (S161) or from a next travel pattern extracted through a next travel pattern extraction process to be described below (S168) (S162).

The travel plan calculating unit 113 refers to the current date and time obtained by the date and time obtaining unit 103, the map data stored in the map database 107, and the landmark data stored in the landmark database 108, and calculates an estimated arrival time at the first arrival place extracted through the first arrival place extraction process (S162) or a next arrival place extracted through a next arrival place extraction process (S166) from the current position or a previous arrival place (S163). Estimated arrival times are calculated in consideration of traffic jam information obtained through a vehicle information communication system (VICS) or the like. Since the technology for calculating the estimated arrival times has already been in practical use for existing car navigation apparatuses, the description of such technology will be omitted here.

The stay time calculating unit 115 refers to the travel histories accumulated in the travel history accumulation unit 109, and calculates an average stay time at each of arrival places (landmarks) (S164). When calculating an estimated arrival time at a next arrival place, the travel plan calculating unit 113 adds, to the estimated arrival time, an average stay time of an arrival place previous to the next arrival place.

The travel plan calculating unit 113 judges whether or not calculating estimated arrival times at all of the arrival places that are in a travel pattern and extracted through the first arrival place extraction process (S162) or the next arrival place extraction process (S166) is completed (S165). In the case where the estimated arrival times are not calculated (No in S165), the travel plan calculating unit 113 extracts a next arrival place in the travel pattern (S166), and repeats the processes subsequent to the estimated arrival time calculation process (S163).

In the case where all of the estimated arrival times at the arrival places that are in the travel pattern and extracted through the first arrival place extraction process (S162) or the next arrival place extraction process (S166) are calculated (Yes in S165), the travel plan calculating unit 113 judges whether or not calculating estimated arrival times for all of the travel patterns extracted through the first travel pattern extraction process (S161) or the next travel pattern extraction process (S168) is completed (S167). In the case where the estimated arrival times for all of the travel patterns are calculated (Yes in S167), the travel plan calculating unit 113 ends the processing.

In the case where there is a travel pattern for which estimated arrival times are not calculated (No in S167), the travel plan calculating unit 113 extracts, from the travel patterns extracted by the travel pattern extracting unit 112, a travel pattern for which estimated arrival times are to be calculated next, and repeats the processes subsequent to the first arrival place extraction process (S162).

Figure 15:
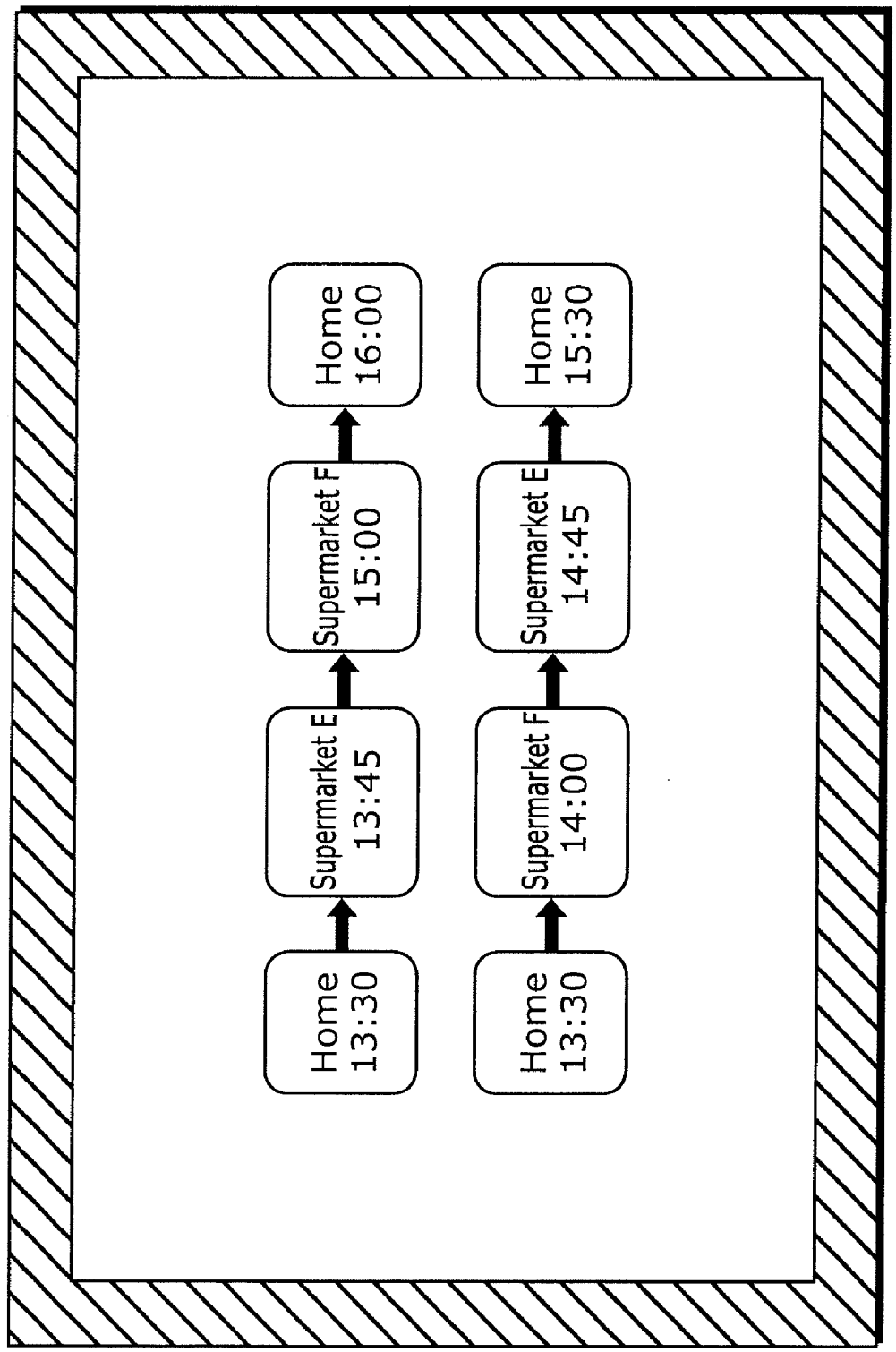
FIG. 15 is a diagram illustrating a display example according to the first embodiment.

FIG. 15 is a diagram illustrating a display example that is displayed by the operations of the travel plan presenting apparatus according to the above-mentioned present embodiment and corresponds to the display unit 106 of the car navigation apparatus 101 shown in FIG. 13. In FIGS. 13 and 15, LM151 is "Supermarket E", and LM152 is "Supermarket F". FIG. 15 shows names of arrival places and estimated arrival times for a travel pattern leading to a base point and having the largest number of occurrences as well as for a travel pattern in which the order of the arrival places in the travel pattern having the largest number of occurrences has been changed. For example, although arrival places to be visited are the same in the two travel patterns, required times are different due to differences in the order to visit the arrival places and in road conditions. As a result, it becomes apparent that the respective estimated arrival times at the final arrival place are different from one another. Here, it is obvious that the second travel pattern enables the user to come home earlier.

As described above, according to the present embodiment, the past travel histories are accumulated, and the travel pattern having the largest number of occurrences is extracted from travel patterns that match the current position and the current period of time, thereby predicting the travel pattern which the user is likely to choose. Moreover, in the case where the order to visit the arrival places can be changed, the estimated arrival times are displayed for the travel patterns in each of which the order to visit the arrival places in the travel pattern having the largest number of occurrences has been changed. Accordingly, a travel plan for travelling over arrival places in the shortest amount of time can be suggested without the user operation. Thus, the user can know, by comparison, the orders to visit the arrival places and the respective estimated arrival times at each arrival place.

It is to be noted that although the travel plan presenting apparatus is activated by the start of the engine in the present embodiment, the travel plan presenting apparatus may be activated by the user operation at a given timing during driving. This does not prevent other user operation for the car navigation apparatus at the time of starting the engine. In this case, the travel plan presenting apparatus starts operating, setting a past departure place that is chronologically nearest to that moment as the first departure place.

Furthermore, although, in the driving status judgment process (S104) shown in FIG. 7, the control unit 105 advances the process to the travel pattern extraction process (S105) in the case where the driving status judgment process (S104) is performed for the first time the travel plan presenting apparatus is activated, the procedure is not limited to this. For example, when a predetermined time is passed after judging that the process is advanced to the travel pattern extraction process (S105), it may judge that the process is advanced to the travel pattern extraction process (S105) again. In addition, in the case where there is an instruction from the user, it may judge that the process is advanced to the travel pattern extraction process (S105) again.

Figure 16:
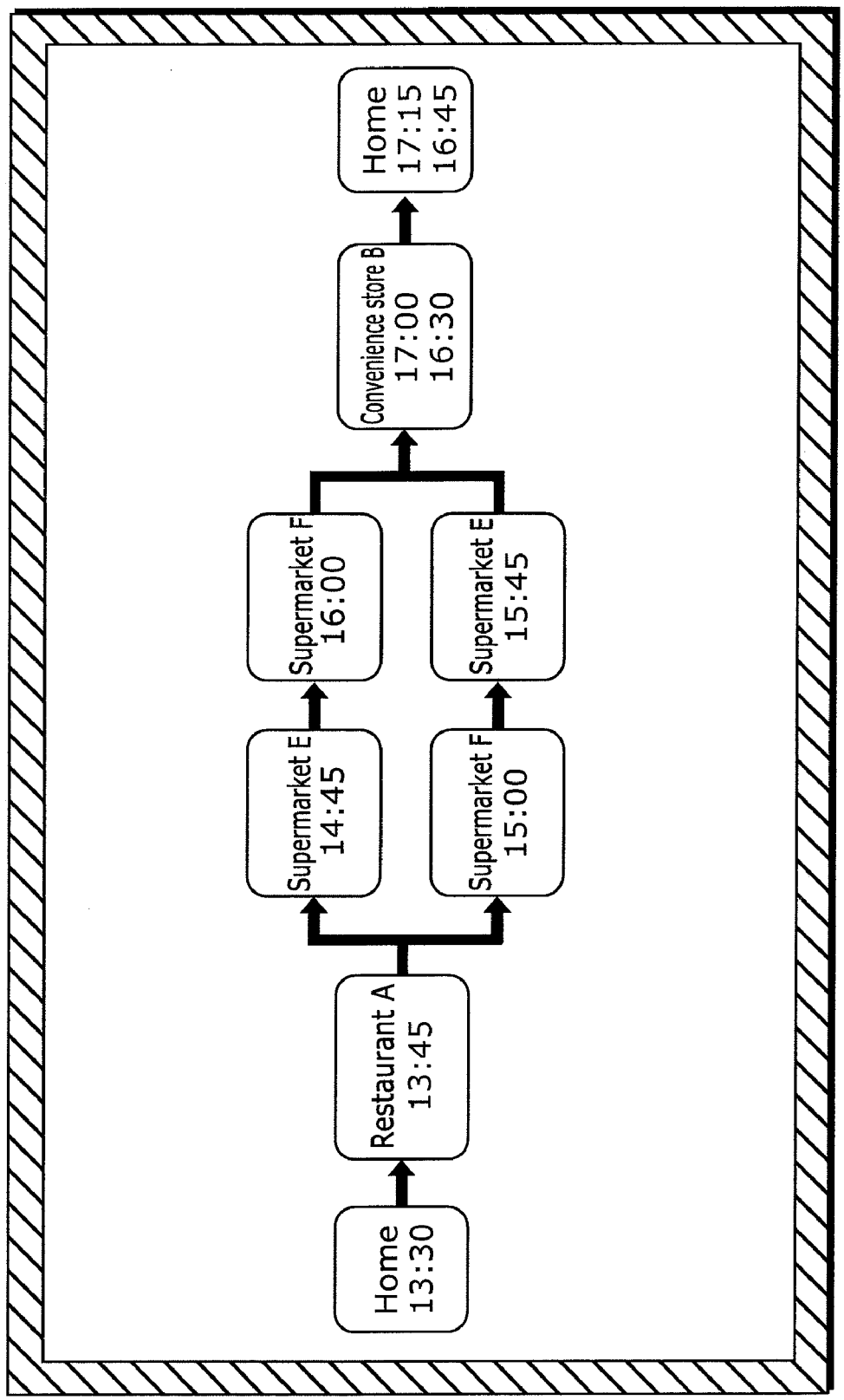
FIG. 16 is a diagram illustrating a display example according to the first embodiment.
Figure 17:
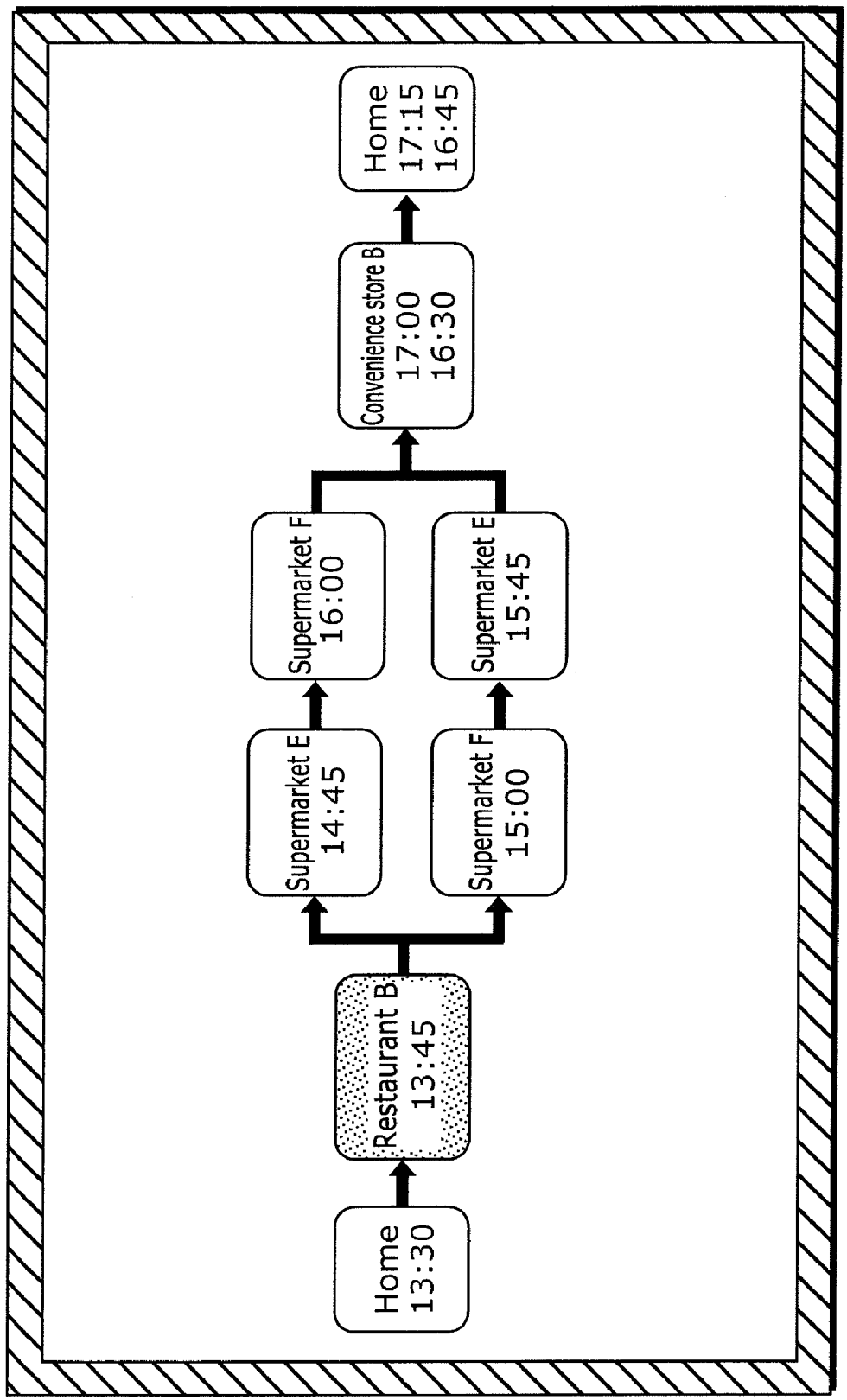
FIG. 17 is a diagram illustrating a display example according to the first embodiment.

Moreover, in the case where arrival places of which order to visit can be changed and arrival places of which order to visit cannot be changed are included in the travel patterns extracted by the travel pattern extracting unit 112 at the time of performing the display process for the display unit 106, the display processing unit 114 may, for instance as shown in FIG. 16, organize the arrival places of which order cannot be changed, branch the arrival places of which order can be changed, and display the branched arrival places. Further, in the case where travel histories are updated by driving by the user and where an arrival place is newly added in extracted travel patterns, for example as with "Restaurant B" shown in FIG. 17, the display processing unit 114 may change a color of the newly added arrival place and display the arrival place.

Furthermore, although the travel patterns in each of which the order of the arrival places has been changed are displayed in a comparative manner, travel patterns may be displayed to the user only in the case where the travel patterns in each of which an order of arrival places has been changed each have an earlier estimated arrival time at the final arrival place than the travel pattern having the largest number of occurrences. In this case, when a travel pattern which the user is most likely to follow has the earliest estimated arrival time at the final arrival place, the user is not bothered by information display.

Moreover, an arrival time specifying unit which receives an input of a time limit by which the user arrives at a base point may be further included in the car navigation apparatus 101 according to the present embodiment, and the travel plan calculating unit 113 may exclude travel patterns other than travel patterns which enable the user to arrive at the base point by the time limit. In this case, there is a high degree of usability as the user can know in what order the user can visit which arrival place by the time limit.

Second Embodiment

Although the first embodiment has described the example where changing the order of the arrival places in the travel pattern having the largest number of occurrences enables the comparison of the travel plans, a second embodiment will describe an example where a user selects, from among travel patterns, a travel pattern the user wants to follow.

Figure 18:
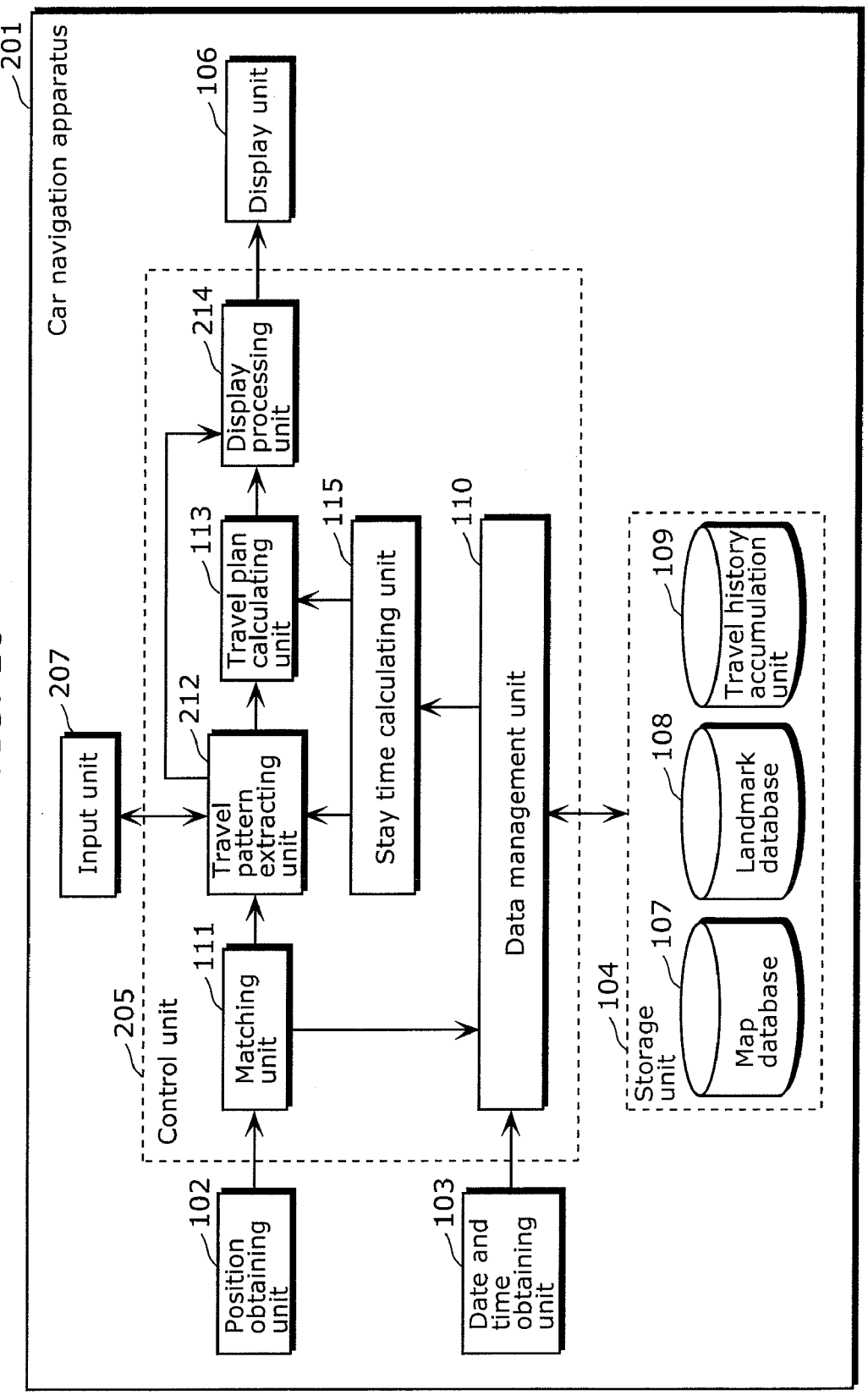
FIG. 18 is a functional block diagram of a travel plan presenting apparatus according to a second embodiment.

As with the first embodiment, the present embodiment is an example where a travel plan presenting apparatus is applied to a car navigation apparatus to be loaded in a car. FIG. 18 is a functional block diagram illustrating a structure of the car navigation apparatus to which the travel plan presenting apparatus is applied according to the present embodiment. As shown in FIG. 18, a car navigation apparatus 201 according to the present embodiment is the car navigation apparatus 101 according to the first embodiment to which an input unit 207 is added. Although the car navigation apparatus 201 differs from the car navigation apparatus 101 in including a control unit 205 instead of the control unit 105, other structural components are the same as in the first embodiment. Although the control unit 205 has the same structure as the control unit 105, the control unit 205 differs from the control unit 105 in including a travel pattern extracting unit 212 and a display processing unit 214 instead of the travel pattern extracting unit 112 and the display processing unit 114, respectively. The travel pattern extracting unit 212 and the display processing unit 214 perform operations that differ slightly from those performed by the travel pattern extracting unit 112 and the display processing unit 114. The following will describe the car navigation apparatus 201 according to the second embodiment, focusing on the differences from the first embodiment.

The input unit 207 receives, from the user, an input selection from travel patterns extracted by the travel pattern extracting unit 212.

Figure 19:
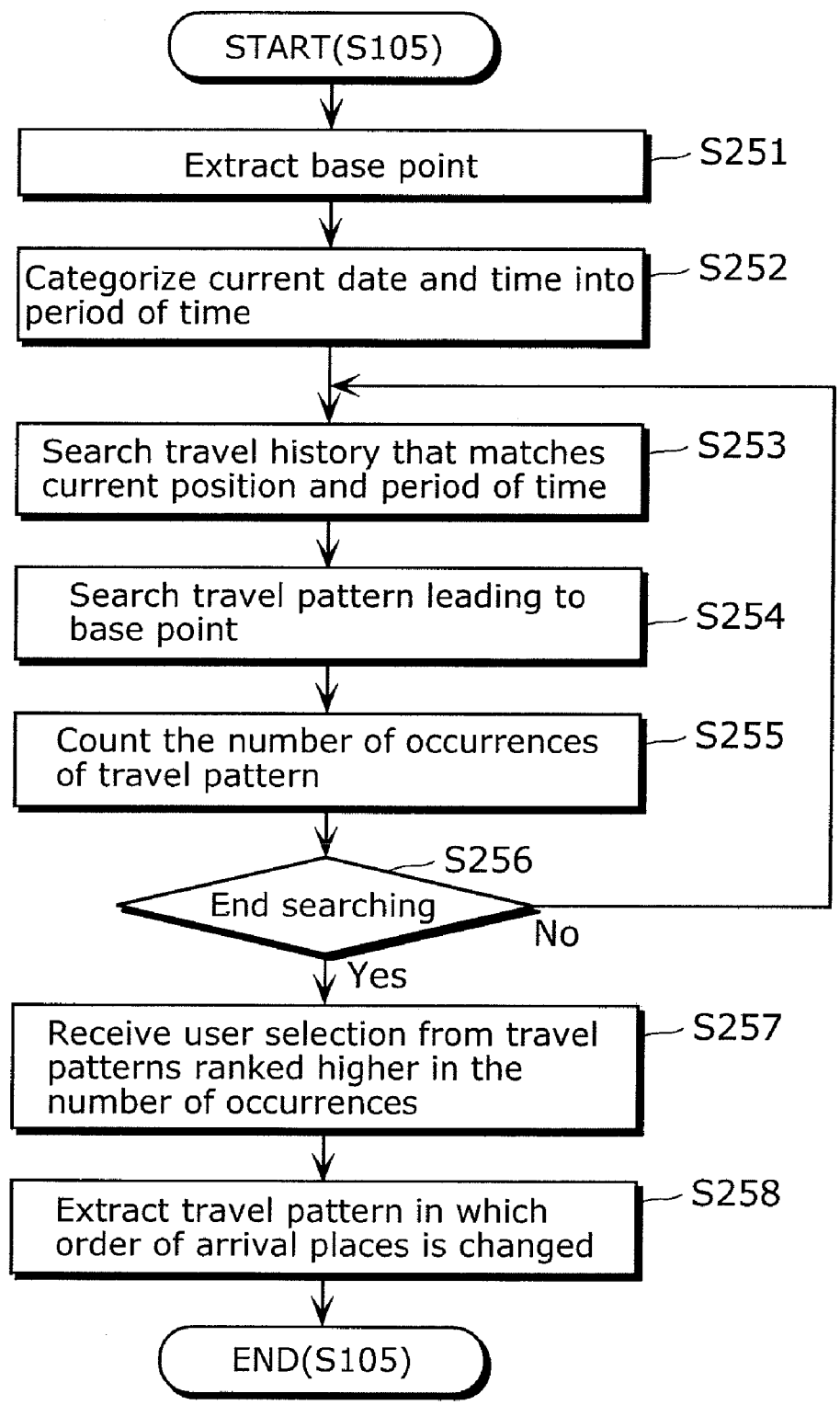
FIG. 19 is a flow chart illustrating a detailed process flow of an extraction process for travel patterns according to the second embodiment.

Here, the travel pattern extraction process (S105 in FIG. 7) that is included in the operations of the travel pattern extracting unit 212 and has a difference from the one in the first embodiment will be described in detail using a flow chart of FIG. 19. The description of other parts will be omitted since such parts are the same as in the first embodiment.

Since processes from a base point extraction process (S251) to a judgment process (S256) are the same as those from the base point extraction process (S151) to the judgment process (S156) in the first embodiment, the description of the processes will be omitted.

Figure 20:
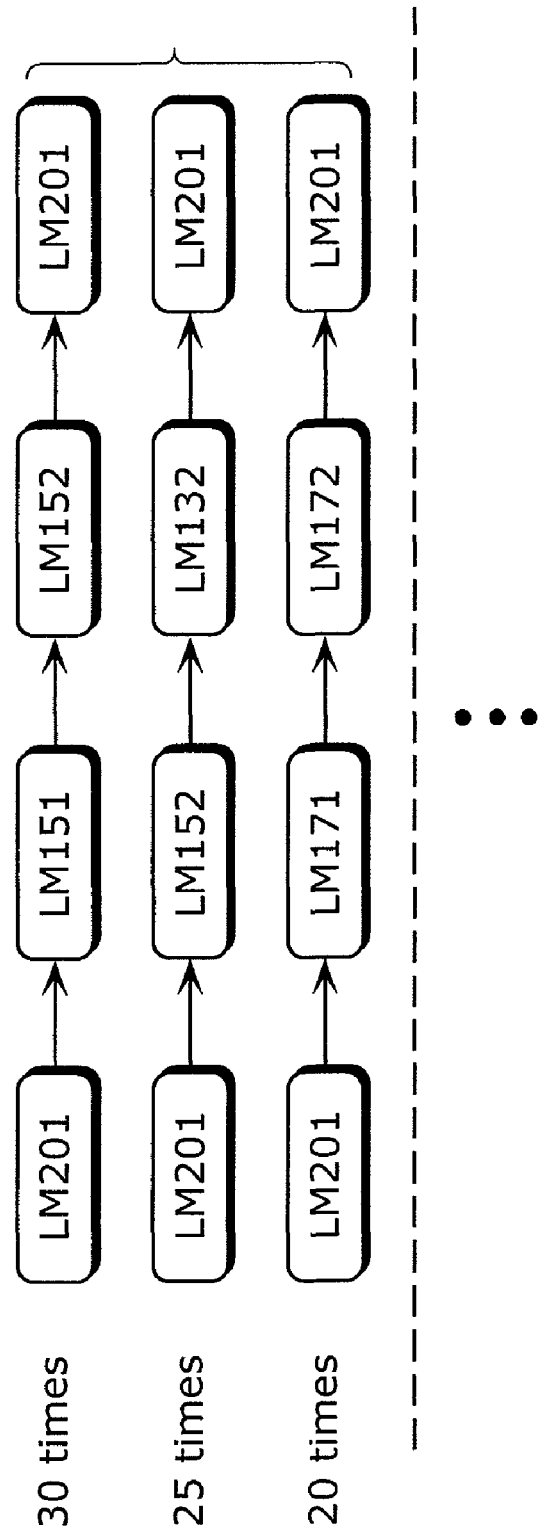
FIG. 20 is a schematic view illustrating an example of travel patterns according to the second embodiment.
Figure 21:
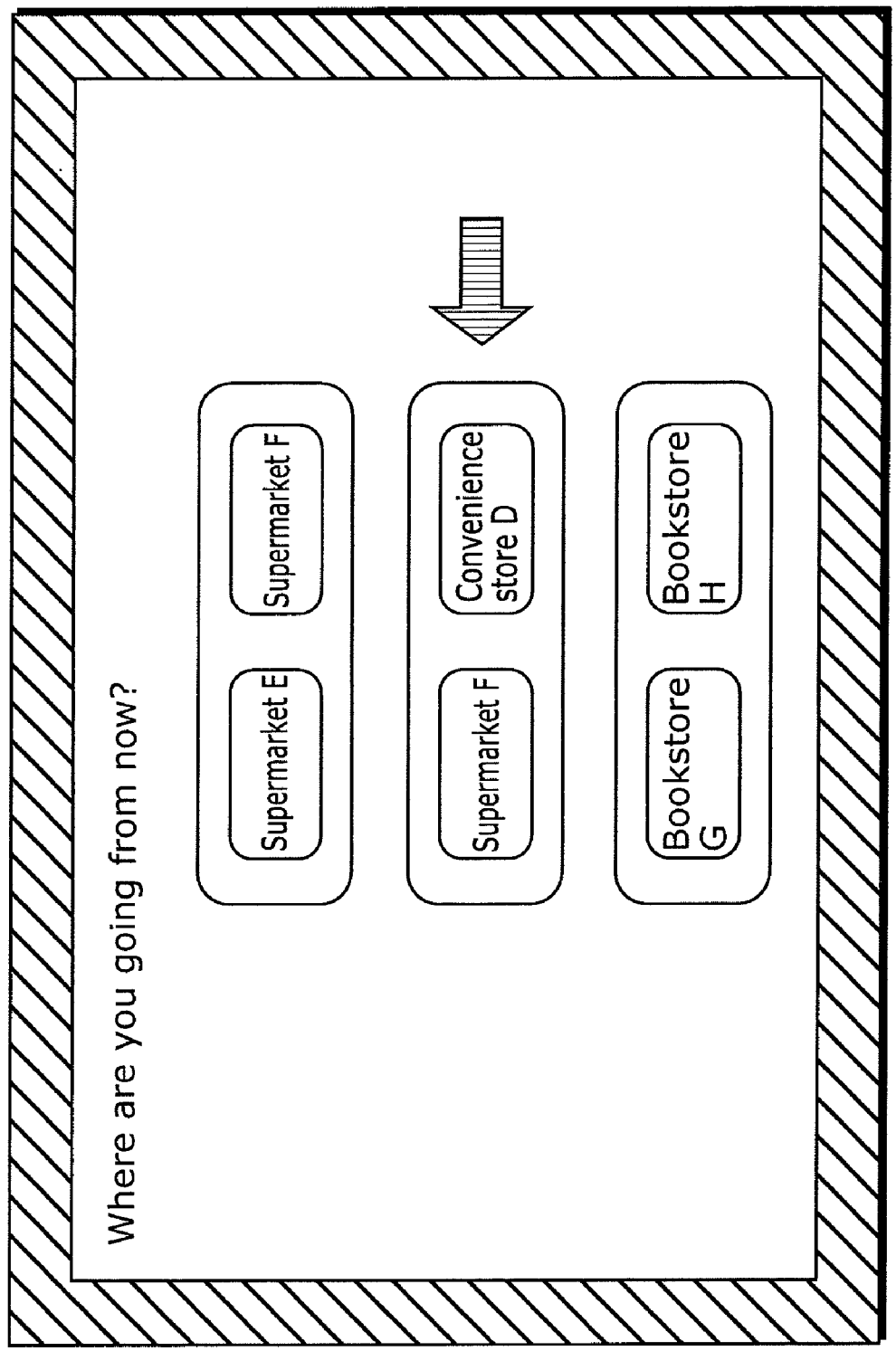
FIG. 21 is a diagram illustrating an example of presenting travel patterns for a user to select according to the second embodiment.

After the number of occurrences is counted for every travel pattern (Yes in S256), the travel pattern extracting unit 212 extracts a predetermined number of travel patterns in descending order of the number of occurrences counted in the counting process (S255). The display processing unit 214 causes the display unit 106 to display the predetermined number of the travel patterns extracted (S257). Accordingly, the predetermined number of the travel patterns extracted is displayed to the user. Although the predetermined number is 3 in consideration of displaying the travel patterns on the display unit 106 of the car navigation apparatus 201, the predetermined number is not limited to 3. FIG. 20 is a schematic view illustrating a process of extracting a travel pattern having the large number of occurrences. In FIG. 20, among travel patterns in which a mobile object departed from base point LM201 and returned again to the base point LM201, travel patterns are shown in descending order of the number of occurrences, and three travel patterns ranked higher in the number of occurrences are extracted and presented to the user. The input unit 207 receives, from the user, an input selection from the travel patterns presented (S257). FIG. 21 shows a screen example where an input selection that is information generated by the display processing unit 214 is received. FIG. 21 corresponds to the travel patterns shown in FIG. 20. In FIGS. 20 and 21, LM151 is "Supermarket E", LM 152 "Supermarket F", LM132 "Convenience store D", LM171 "Bookstore G", and LM172 "Bookstore H". Here, the second travel pattern is selected by the user.

Figure 22:
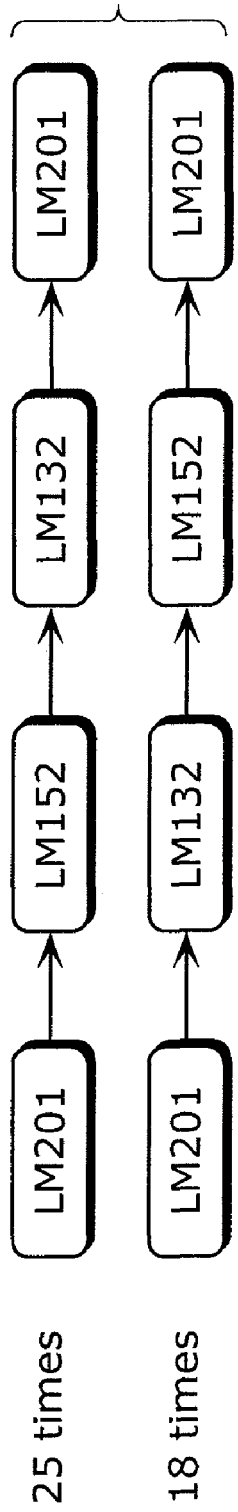
FIG. 22 is a schematic view illustrating a change of an order of arrival places in a travel pattern according to the second embodiment.

As with the travel pattern extraction process (S158 in FIG. 8) in the first embodiment, when travel patterns in each of which an order of arrival places in the travel pattern selected in the input selection receiving process (S257) has been changed are accumulated in the travel history accumulation unit 109, the travel pattern extracting unit 212 extracts the travel patterns (S258). FIG. 22 schematically illustrates the present step. In FIG. 22, the second travel pattern is a travel pattern in which an order of arrival places in the first travel pattern has been changed, and is a travel pattern extracted from travel histories.

Figure 23:
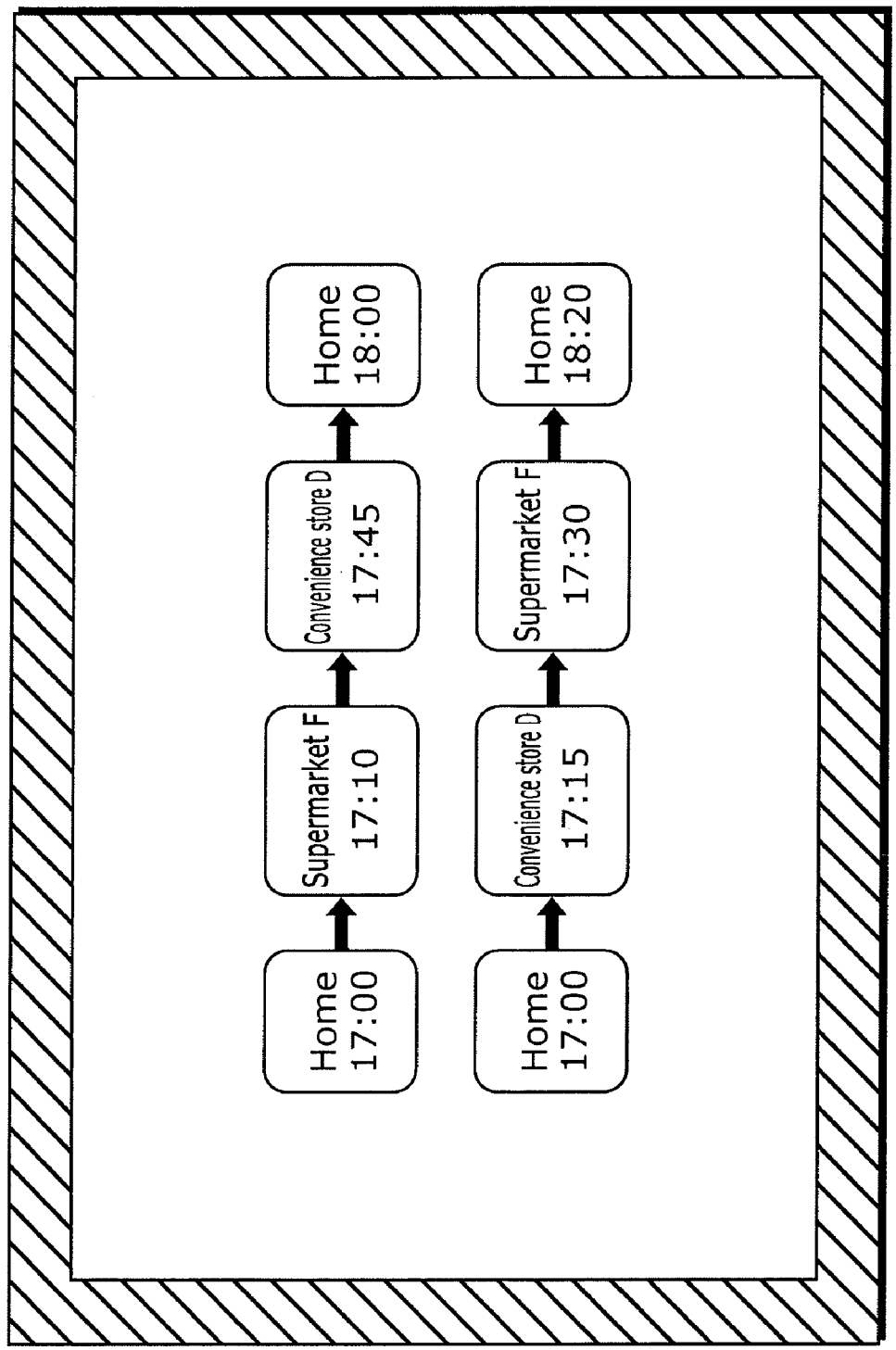
FIG. 23 is a diagram illustrating a display example according to the second embodiment.

FIG. 23 is a diagram illustrating a display example that is displayed by the operations of the travel plan presenting apparatus according to the present embodiment and corresponds to the display unit 106 of the car navigation apparatus 201 shown in FIG. 22. FIG. 23 shows names of arrival places and estimated arrival times for the travel pattern leading to a base point and selected by the user as well as for a travel pattern in which the order of the arrival places in the selected travel pattern has been changed. For example, although arrival places to be visited are the same in the two travel patterns, required times are different due to differences in the order to visit the arrival places and in road conditions. As a result, it becomes apparent that the respective estimated arrival times at the final arrival place are different from one another. Here, it is obvious that the first travel pattern enables the user to come home earlier.

As described above, according to the present embodiment, the past travel histories are accumulated, and the travel patterns each having the number of occurrences equal to or larger than the predetermined number are extracted from travel patterns that match the current position and the current period of time, thereby predicting the travel patterns which the user is likely to choose and presenting the predicted travel patterns to the user. The input selection of one travel pattern is received from the user, and in the case where an order to visit arrival places can be changed, estimated arrival times of travel patterns in each of which the order of the arrival places in the travel pattern has been changed are displayed. Accordingly, for a travel over arrival places to which the user wants to go, the user can know, by comparison, orders to visit the arrival places and an estimated arrival time at each arrival place with simple operation. Even in the case where arrival places to which the user wants to go cannot be necessarily confirmed accurately only by the prediction, after arrival places where the user is highly likely to visit are narrowed down by the prediction, it is possible to further improve convenience and reliability by allowing the user to determine the final selection.

Third Embodiment

Although the second embodiment has described the example where the user selects one travel pattern from among the travel patterns each having the large number of occurrences, a third embodiment will describe an example where a user selects not a travel pattern but one set of arrival places from among sets of arrival places each having the large number of occurrences. The second embodiment is effective, in the case where there is a great difference in the number of occurrences between travel patterns when an order of arrival places in each travel pattern is changed, that is, in the case where the user to some extent cares about the order to travel. In contrast, the present embodiment is effective, in the case where there is a small difference in the number of occurrences between the travel patterns when the order of the arrival places in each travel pattern is changed, that is, in the case where the user does not particularly care about the order to travel. For instance, in the case where the number of occurrences of a travel pattern from arrival place A to arrival place B is 30 times and the number of occurrences of a travel pattern from arrival place B to arrival place A is 5 times, the difference in the number of occurrences is great, and it is apparent that the user cares about the order. In this case, the second embodiment is effective. On the other hand, in the case where the number of occurrences of the travel pattern from the arrival place A to the arrival place B is 20 times and the number of occurrences of the travel pattern from the arrival place B to the arrival place A is 15 times, the difference in the number of occurrences is small, and it can be judged that the user does not particularly care about the order. The present embodiment effectively operates in this case.

Figure 24:
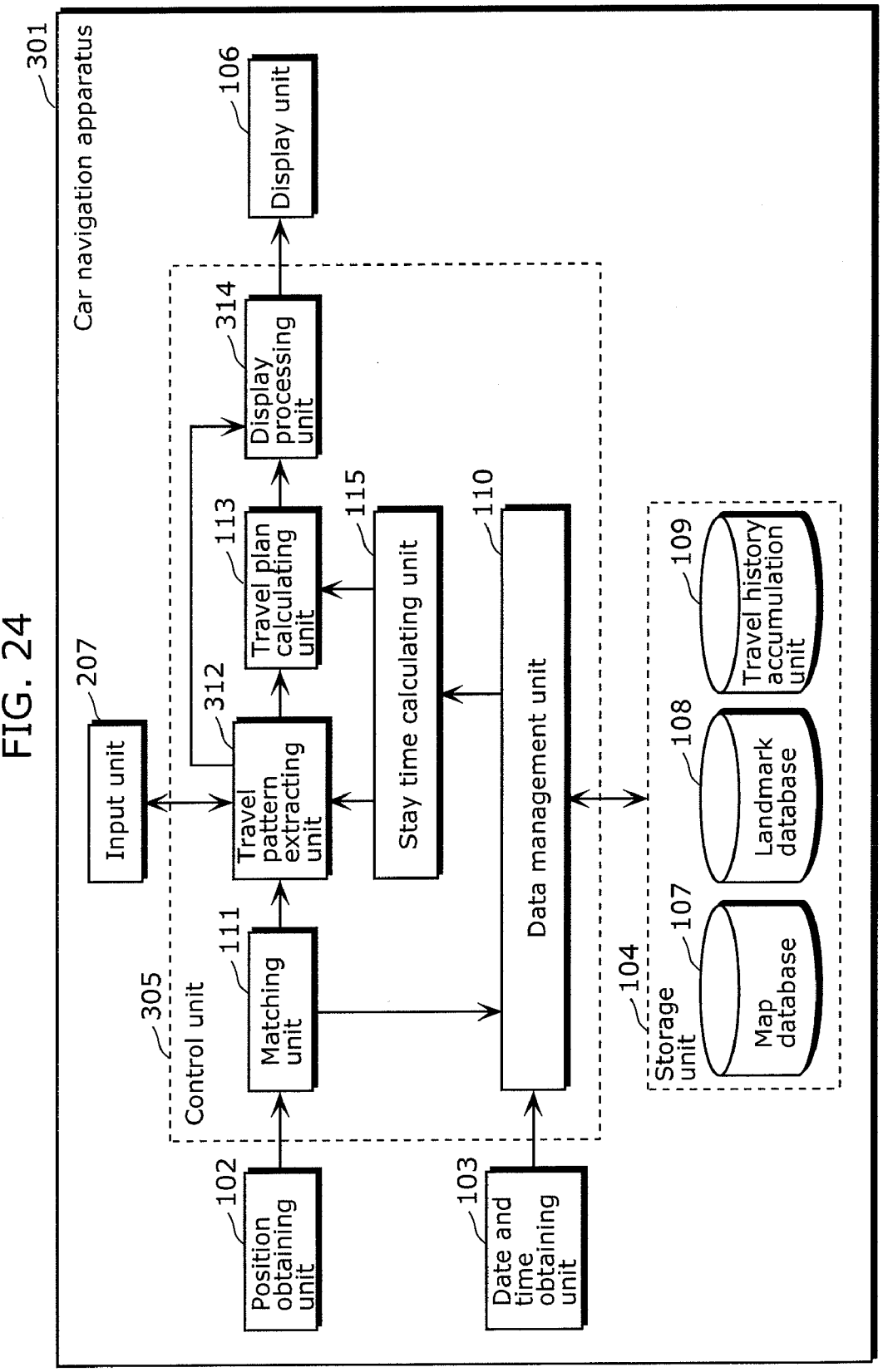
FIG. 24 is a functional block diagram of a travel plan presenting apparatus according to a third embodiment.

As with the second embodiment, the present embodiment is an example where a travel plan presenting apparatus is applied to a car navigation apparatus to be loaded in a car. FIG. 24 is a functional block diagram illustrating a structure of the car navigation apparatus to which the travel plan presenting apparatus is applied according to the present embodiment. As shown in FIG. 24, although a car navigation apparatus 301 according to the present embodiment includes the same components as the car navigation apparatus 201 according to the second embodiment, a control unit 305 instead of the control unit 205 is used for the car navigation apparatus 301. It is to be noted that the control unit 305 includes a travel pattern extracting unit 312 and a display processing unit 314 instead of the travel pattern extracting unit 212 and the display processing unit 214, respectively. The travel pattern extracting unit 312 and the display processing unit 314 perform operations that differ slightly from those performed by the travel pattern extracting unit 212 and the display processing unit 214. The following will describe the car navigation apparatus 301 according to the third embodiment, focusing on the differences from the second embodiment.

The travel pattern extracting unit 312 extracts, via the data management unit 110, sets of arrival places that exist in a travel from a base point to the same or a different base point, from travel histories that match an ID of a current position converted by the matching unit 111 and a current date and time obtained by the date and time obtaining unit 103 and that are accumulated in the travel history accumulation unit 109. For instance, in the case where there is a travel pattern in which a mobile object departed from a home, a base point, visited arrival places A and B, and returned to the home, a set of arrival places for each of which an order is not considered is represented by (A, B).

Figure 25:
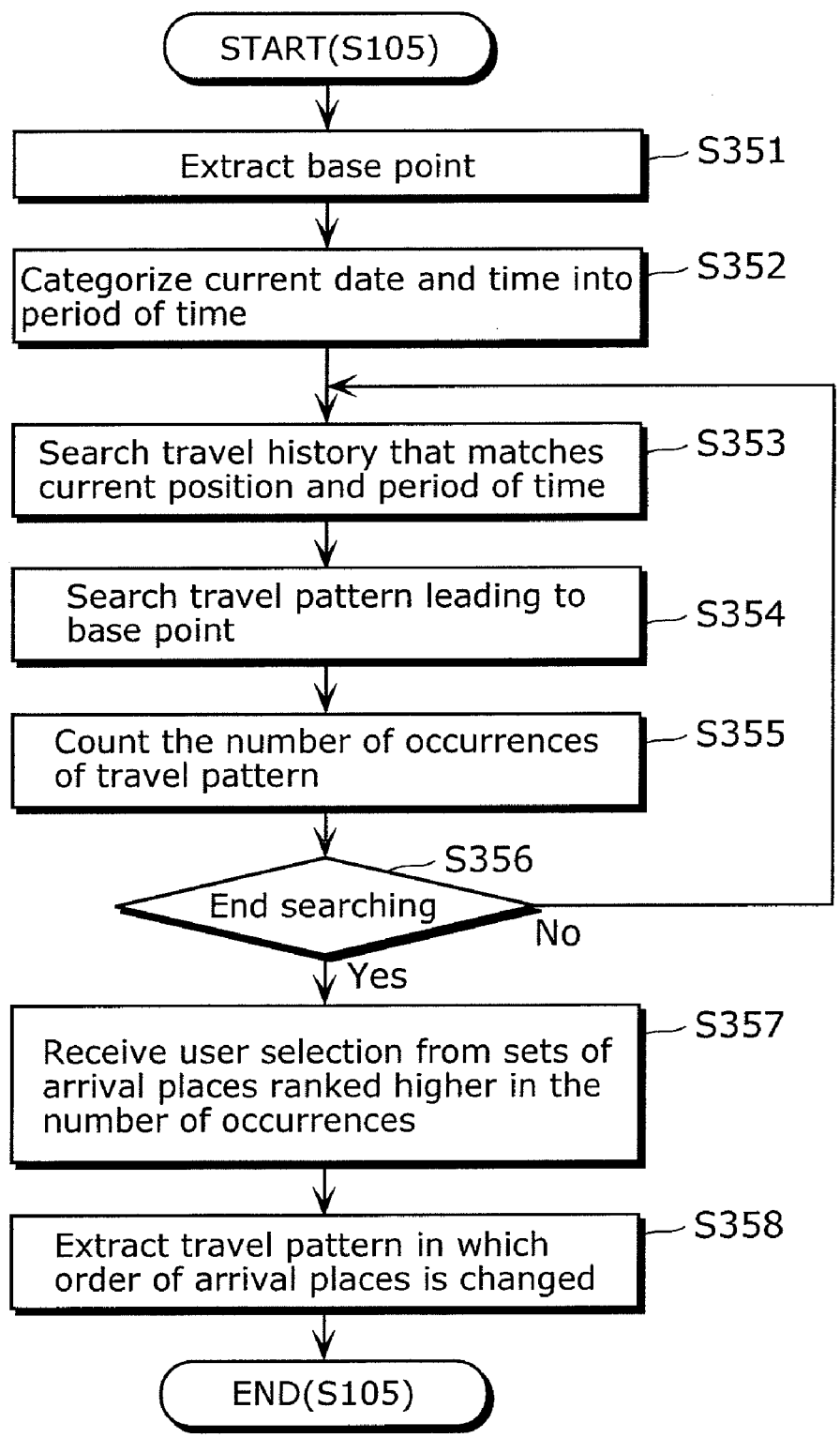
FIG. 25 is a flow chart illustrating a detailed process flow of an extraction process for travel patterns according to the third embodiment.

Here, the travel pattern extraction process (S105 in FIG. 7) that is included in the operations of the travel pattern extracting unit 312 and has a difference from the one in the second embodiment will be described in detail using the flow chart of FIG. 25. The description of other parts will be omitted since such parts are the same as in the second embodiment.

Since processes from a base point extraction process (S351) to a travel history retrieving process (S353), a judgment process (S356), and a travel pattern extraction process (S358) are the same as those from the base point extraction process (S251) to the base point extraction process (S253), the judgment process (S256), and the travel pattern extraction process (S258) in the second embodiment, respectively, the description of the processes will be omitted.

As with the first embodiment, after the travel history retrieving process (S353), the travel pattern extracting unit 312 retrieves travel histories continuing the travel history found through the travel history retrieving process (S353) from the travel histories accumulated in the travel history accumulation unit 109. Next, the travel pattern extracting unit 312 organizes the continuous travel histories into one set of arrival places (S354). Whereas the travel pattern is the collection of ordered arrival places, the set of arrival places is a collection of arrival places for each of which an order is not considered.

Figure 26:
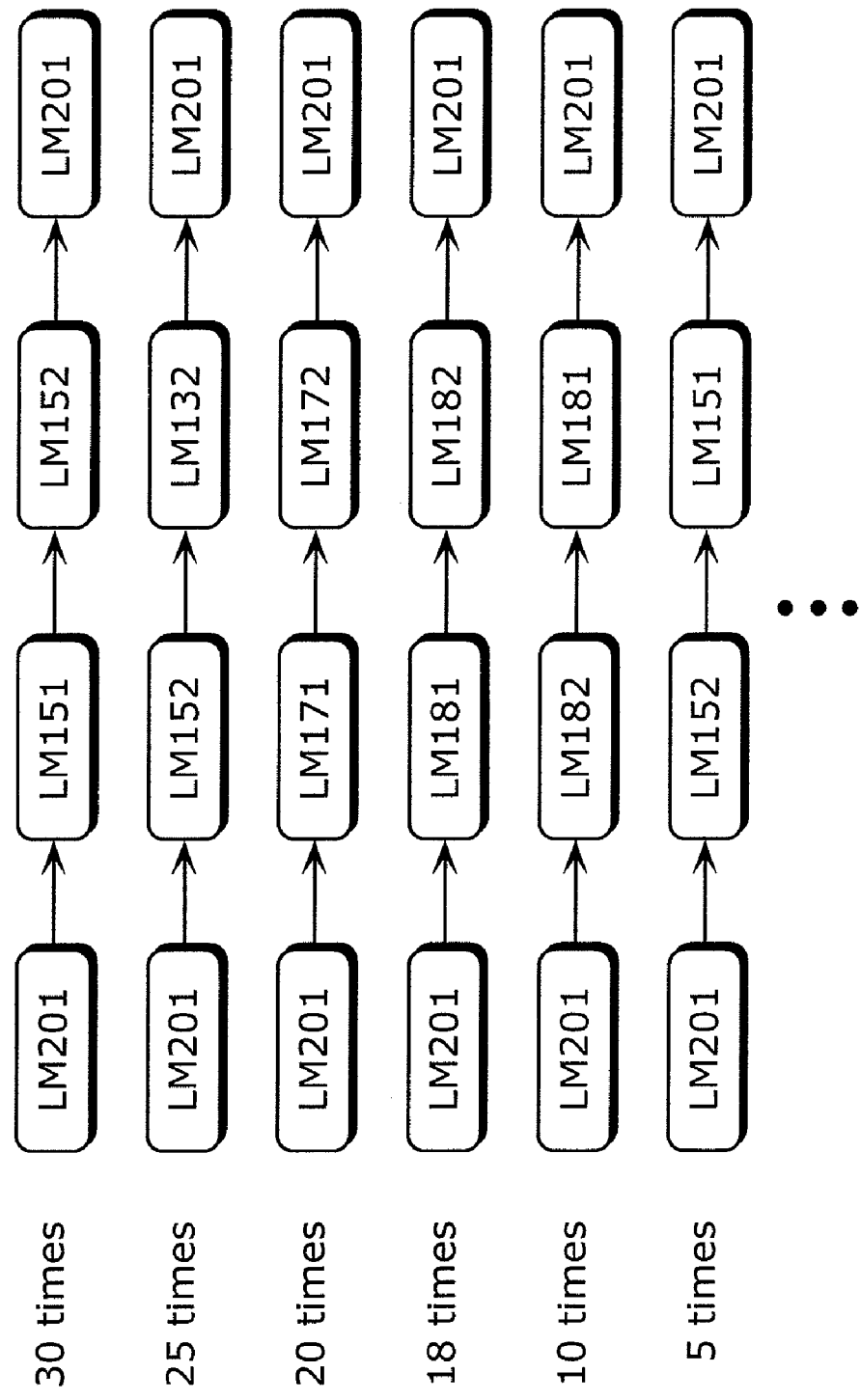
FIG. 26 is a schematic view illustrating an example of travel patterns according to the third embodiment.

When the set of arrival places organized through the set of arrival places retrieving process (S354) has been found in the travel histories accumulated in the travel history accumulation unit 109, the travel pattern extracting unit 312 adds 1 to a count of the set of arrival places, and when not found, the travel pattern extracting unit 312 sets the count to 1 (S355). In this manner, the number of occurrences of each of sets of arrival places is counted. For example, in the case where travel patterns as shown in FIG. 26 can be extracted from travel histories accumulated in the travel history accumulation unit 109, while a count value of a travel pattern is the number of occurrences of each of travel patterns in the second embodiment, a count value of a set of arrival places is a sum of the numbers of occurrences of travel patterns in each of which an order of the arrival places has been changed. Sets of arrival places and corresponding count values shown in FIG. 27 are obtained from the travel patterns shown in FIG. 26. For instance, adding 30 occurrence times of a travel pattern from LM151 to LM152 to 5 occurrence times of a travel pattern from LM152 to LM151 shown in FIG. 26 equals to 35 occurrence times of a set (LM151, LM152) as shown in FIG. 27.

Whereas the travel pattern is counted in the second embodiment, the set of arrival places is counted in the present embodiment. Accordingly, as the counting method differs in both embodiments, an order in descending order of the number of occurrences of the set of arrival places may differ from an order in descending order of the number of occurrences of the travel pattern in the second embodiment.

Figure 28:
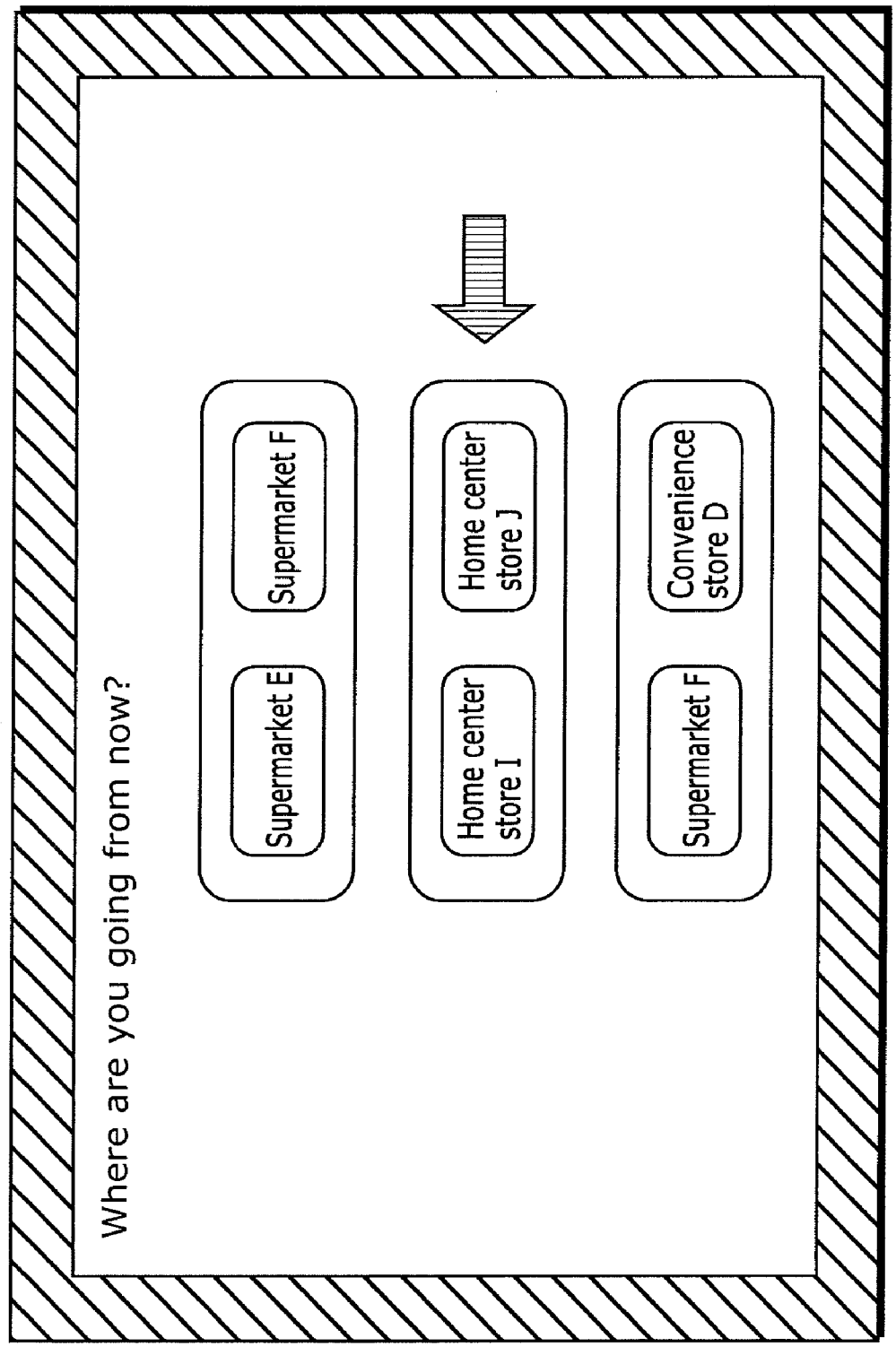
FIG. 28 is a diagram illustrating an example of presenting sets of arrival places for a user to select according to the third embodiment.

After the number of occurrences is counted for every set of arrival places (Yes in S356), the travel pattern extracting unit 312 extracts a predetermined number of sets of arrival places in descending order of the number of occurrences counted in the counting process (S355). The display processing unit 314 causes the display unit 106 to display the predetermined number of the sets of arrival places extracted (S357). Accordingly, the predetermined number of the sets of arrival places extracted is presented to the user. Although the predetermined number is 3 in consideration of displaying the sets of arrival places on the display unit 106 of the car navigation apparatus 301, the predetermined number is not limited to 3. The input unit 207 receives, from the user, an input selection from the sets of arrival places presented (S357). FIG. 28 shows a screen example where an input selection is received. FIG. 28 corresponds to the sets of arrival places shown in FIG. 27. In FIGS. 27 and 28, LM151 is "Supermarket E", LM 152 "Supermarket F", LM181 "Home center store I", LM182 "Home center store J", and LM132 "Convenience store D". Here, the second set of arrival places is selected by the user.

Figure 29:
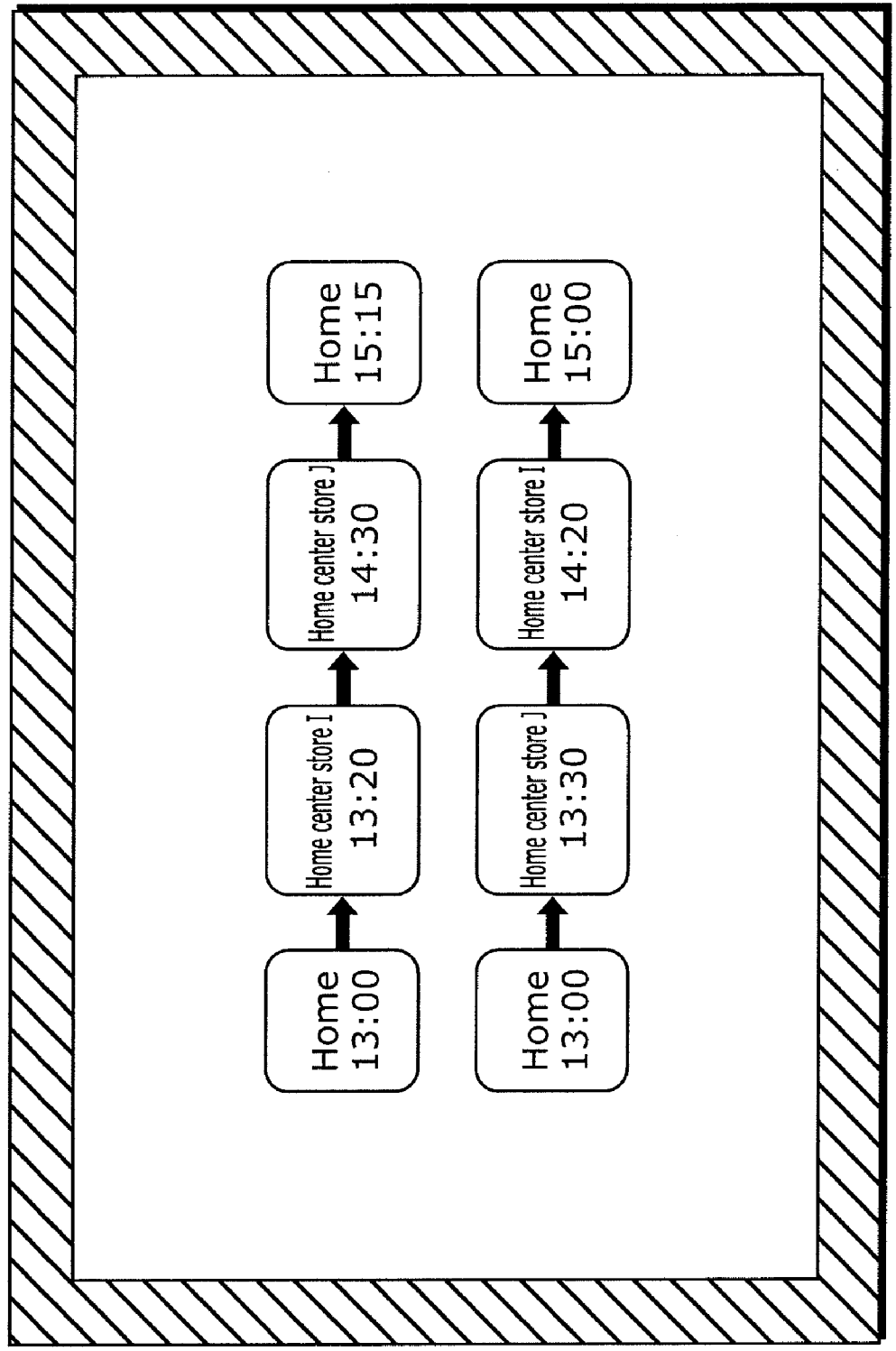
FIG. 29 is a diagram illustrating a display example according to the third embodiment.

FIG. 29 is a diagram illustrating a display example displayed on the display unit 106 of the car navigation apparatus 301 by the operations of the travel plan presenting apparatus according to the present embodiment. FIG. 29 shows names of arrival places and estimated arrival times for the set of arrival places leading to a base point and selected by the user as well as for a travel pattern in which an order of the arrival places in the set of arrival places has been changed. For example, although arrival places to be visited are the same in the two travel patterns, required times are different due to differences in the order to visit the arrival places and in road conditions. As a result, it becomes apparent that the respective estimated arrival times at the final arrival place are different from one another. Here, it is obvious that the first travel pattern enables the user to come home earlier.

As described above, according to the present embodiment, the past travel histories are accumulated, and the sets of arrival places each having the number of occurrences equal to or larger than the predetermined number are extracted from sets of arrival places that match the current position and the current period of time, thereby predicting the sets of arrival places which the user is likely to choose and presenting the predicted sets of arrival places to the user. The input selection of one set of arrival places is received from the user, and in the case where an order to visit the arrival places can be changed, estimated arrival times of travel patterns in each of which an order of the arrival places in the set of arrival places has been changed are displayed. Accordingly, for a travel over arrival places to which the user wants to go, the user can know, by comparison, orders to visit the arrival places and an estimated arrival time at each arrival place with simple operation.

Fourth Embodiment

Although the first embodiment has described the example where the travel pattern that matches the current position and the period of time and has the largest number of occurrences is presented, a fourth embodiment will describe an example where one destination that matches the current position and the current period of time is determined from travel histories and a travel pattern is generated by retrieving stops before and after the destination. This is effective in the case where there is one place as an arrival place to which a user wants to go and where the user wants to know whether there is enough time to go to other arrival places as stops before and after the place within a given length of time.

Figure 30:
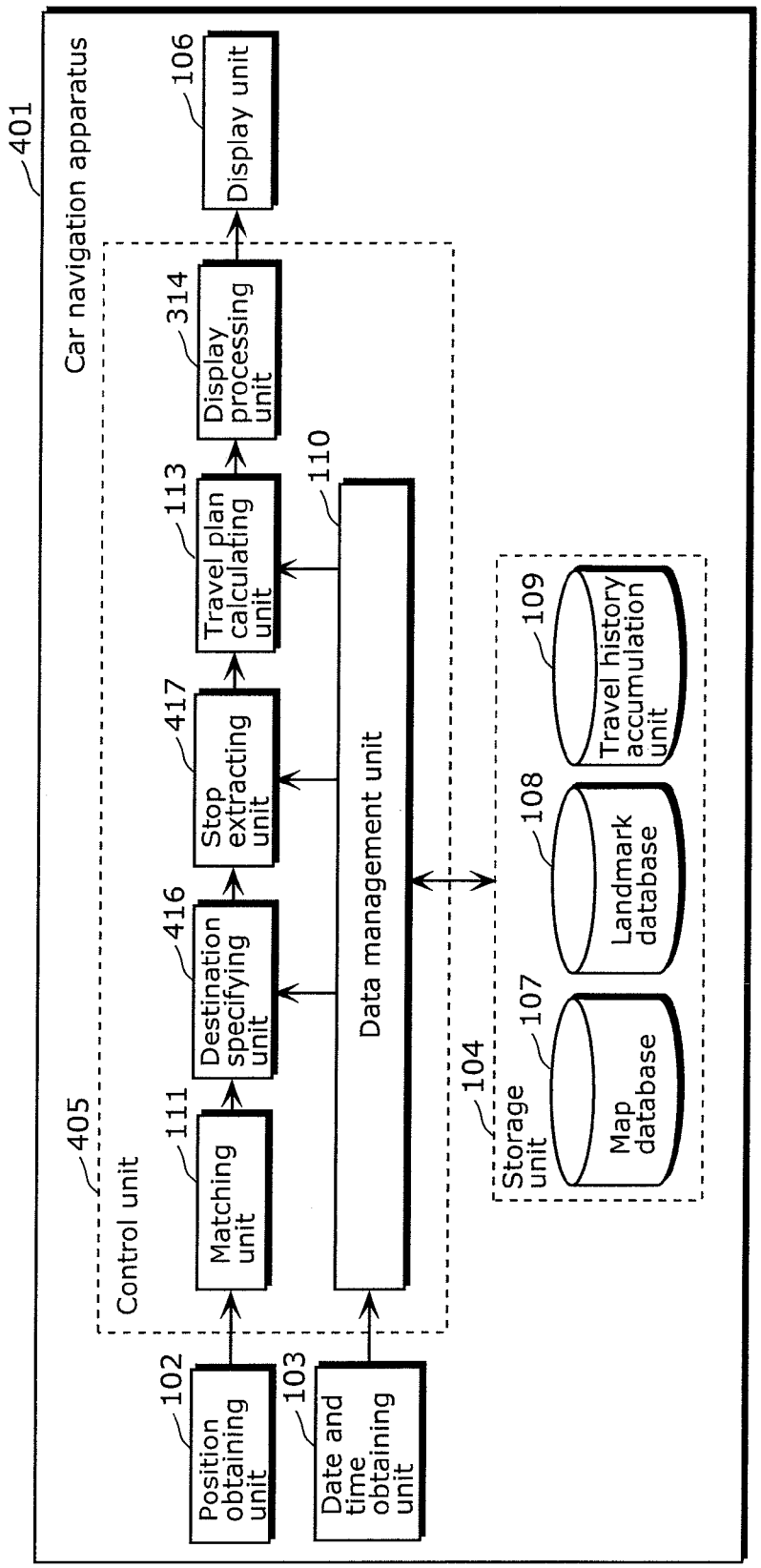
FIG. 30 is a functional block diagram of a travel plan presenting apparatus according to a fourth embodiment.

As with the first embodiment, the present embodiment is an example where a travel plan presenting apparatus is applied to a car navigation apparatus to be loaded in a car. FIG. 30 is a functional block diagram illustrating a structure of the car navigation apparatus to which the travel plan presenting apparatus is applied according to the present embodiment.

A car navigation apparatus 401 according to the present embodiment has the structure of the car navigation apparatus 101 according to the first embodiment in which a control unit 405 is included instead of the control unit 105. The control unit 405 has the structure of the control unit 105 from which the stay time calculating unit 115 is removed and in which a destination specifying unit 416 and a stop extracting unit 417 are included instead of the travel pattern extracting unit 112. Other structural components are the same as in the first embodiment.

The destination specifying unit 416 receives, from the user, a specification of the destination to which the user wants to go most.

The stop extracting unit 417 extracts arrival places to be visited as stops before and after the destination specified by the destination specifying unit 416.

Figure 31:
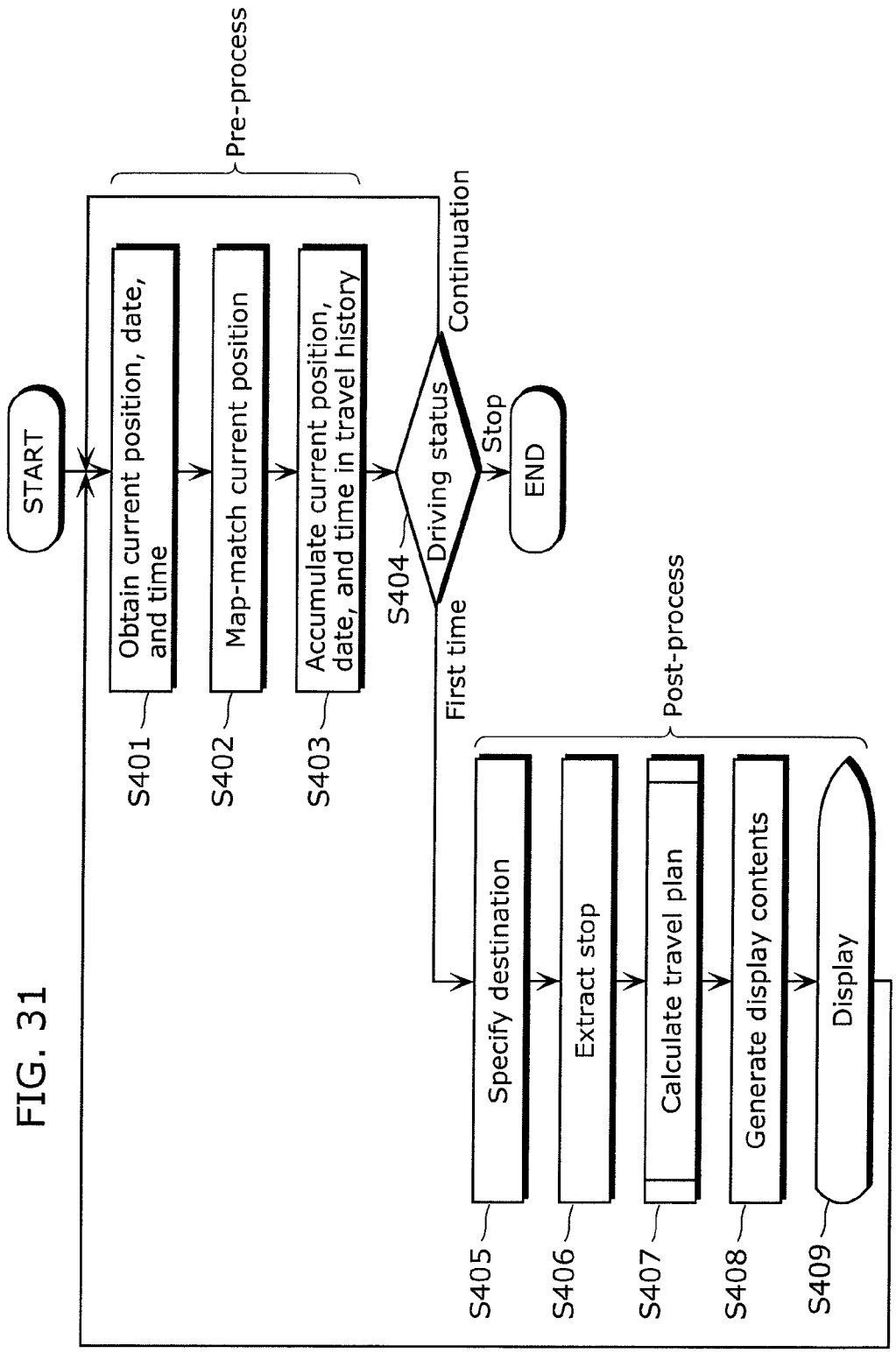
FIG. 31 is a flow chart illustrating a process flow according to the fourth embodiment.

The operations of the car navigation apparatus 401 according to the present embodiment which is structured as mentioned above will be described using the flow chart of FIG. 31.

Since processes from a position, date, and time obtaining process (S401) to a driving status judgment process (S404) and from a travel plan calculation process (S407) to a display process (S409) are the same as those from the position, date, and time obtaining process (S101 in FIG. 7) to the driving status judgment process (S104) and from the travel plan calculation process (S106) to the display process (S108) in the first embodiment, the description of the processes will be omitted.

Figure 32:
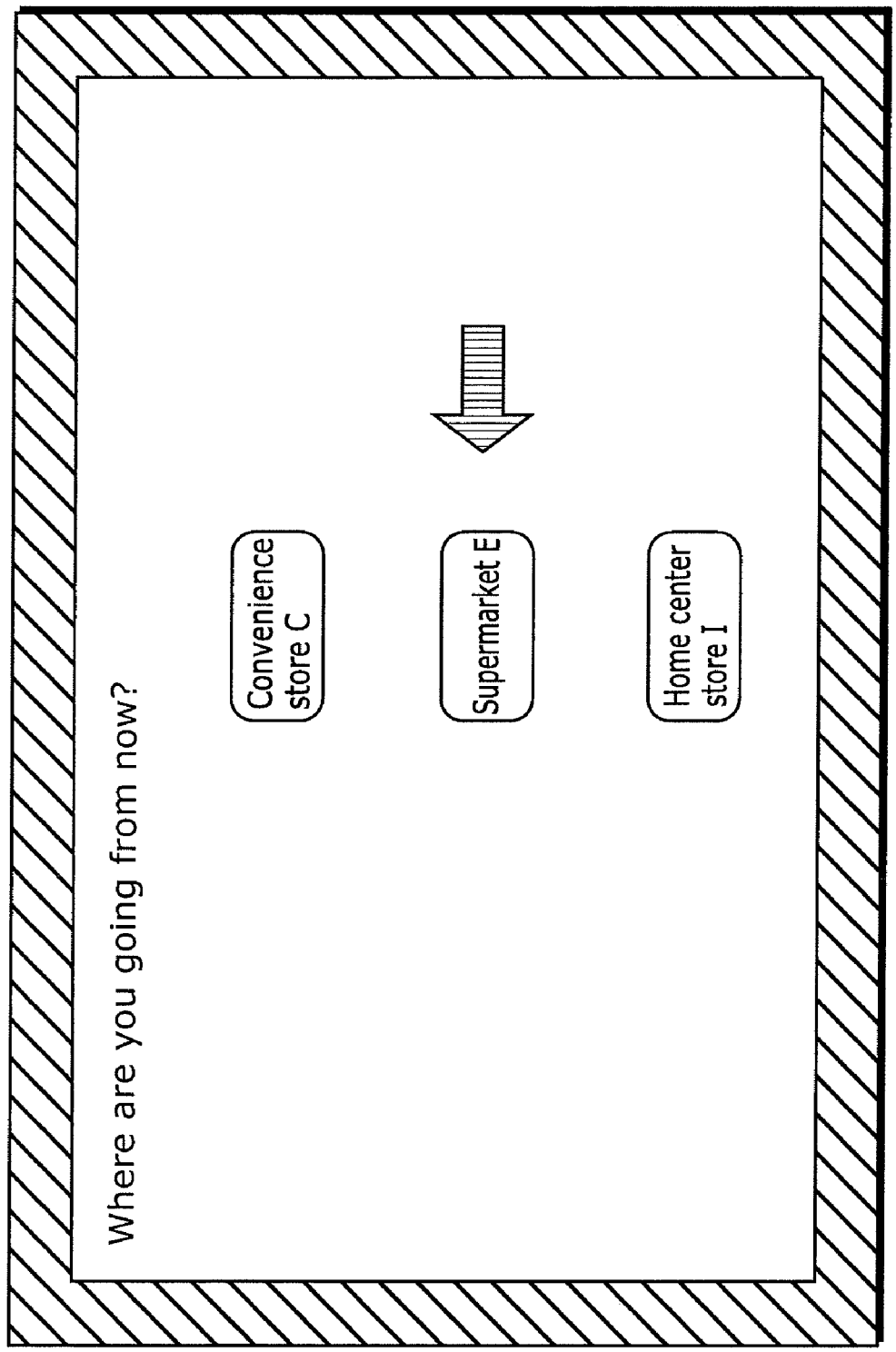
FIG. 32 is a diagram illustrating an example of presenting destinations for a user to select according to the fourth embodiment.

In the case where it is judged in the driving status judgment process (S404) that a vehicle has been moving and where the driving status judgment process (S404) is performed for the first time (First time at S404), the destination specifying unit 416 retrieves, from the travel histories accumulated in the travel history accumulation unit 109, a travel history in which a point having the same ID as the current position in the current period of time is departed from. In the case where sufficient travel histories are accumulated, such travel histories are naturally found. The destination specifying unit 416 extracts a predetermined number of arrival places in descending order of the number of occurrences of each arrival place in these travel histories. The extracted arrival places are arrival places in order of descending probability that the user is likely to go to. Next, the destination specifying unit 416 presents the extracted arrival places to the user via the display unit 106, and receives one specification of the destination to which the user wants to go most from now (S405). FIG. 32 illustrates a screen example where a specification for a destination is received. In the case where the destination to which the user wants to go most is not among the presented arrival places, the user can specify a destination with other methods such as retrieving the landmark database 108.

Figure 33:
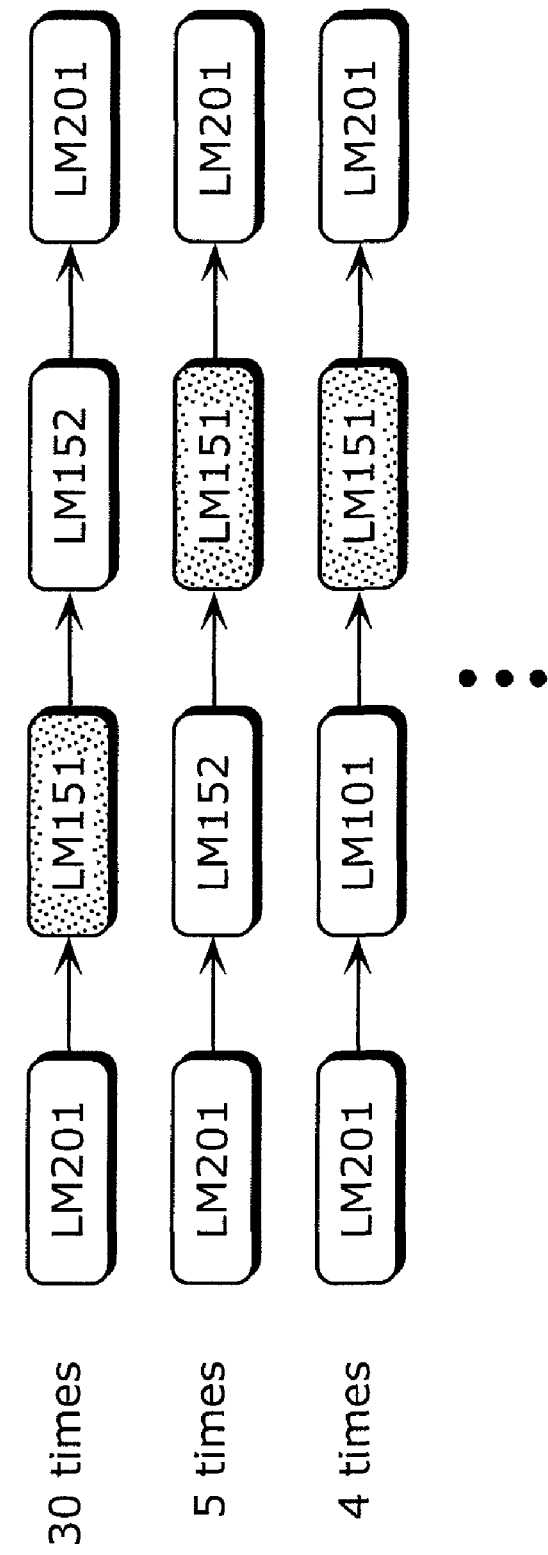
FIG. 33 is a schematic view illustrating an example of travel patterns according to the fourth embodiment.

The stop extracting unit 417 retrieves a travel history including the destination specified in the destination specification process (S405), and counts the number of occurrences of each of stop candidates, the stop candidates being as arrival places that are before and after the destination and visited within a predetermined time (e.g., 2 hours, respectively). The stop extracting unit 417 extracts, as stops, a predetermined number of stop candidates in descending order of the number of occurrences, and organizes the extracted stops and the destination into travel patterns (S406). FIG. 33 illustrates a schematic view of the present step. As shown in FIG. 33, the stop extracting unit 417 extracts travel patterns each of which always includes the specified destination "LM151" that is preceded and followed by stops.

Figure 34:
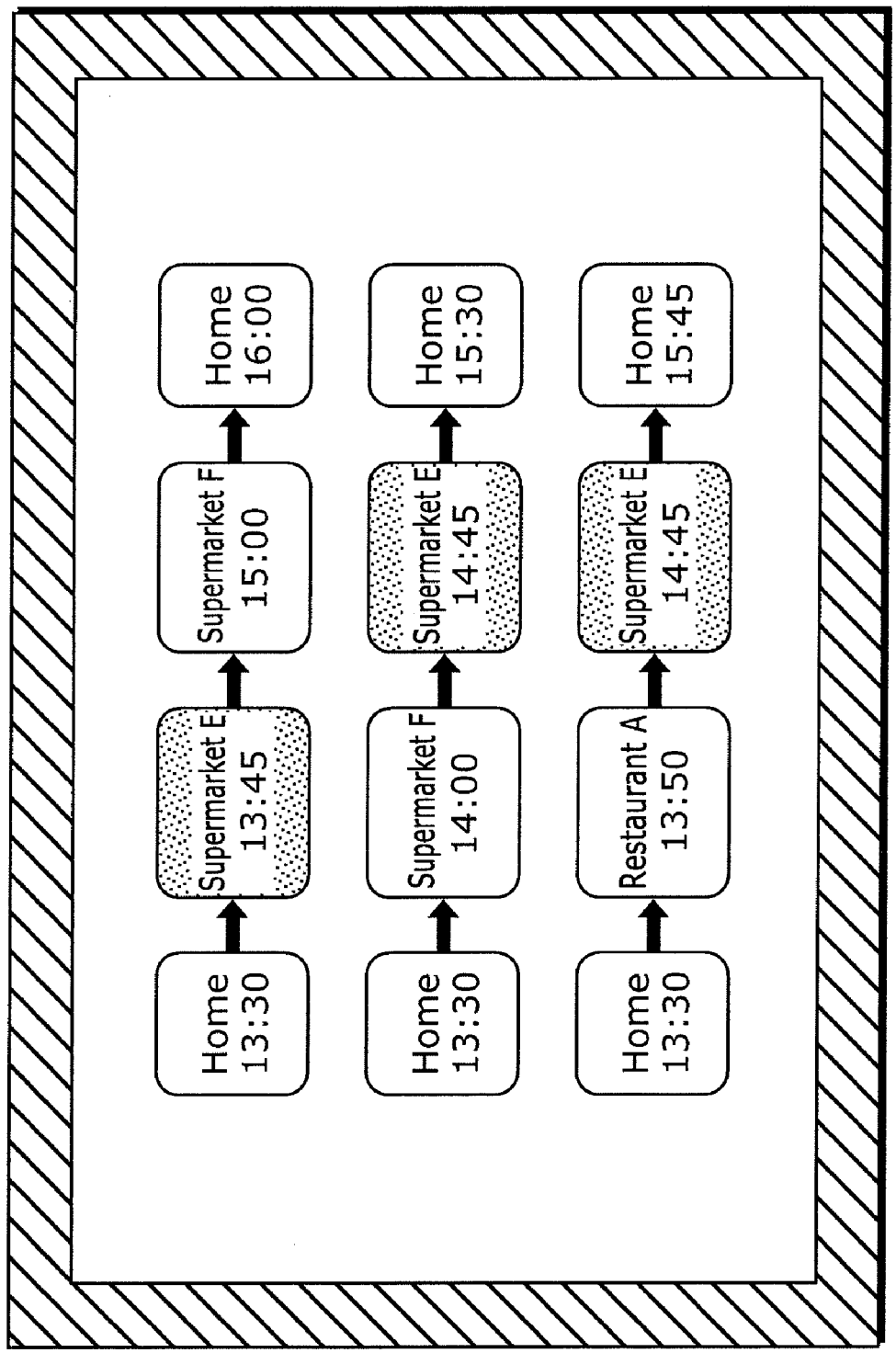
FIG. 34 is a diagram illustrating a display example according to the fourth embodiment.

FIG. 34 is a diagram illustrating a display example that is displayed by the operations of the travel plan presenting apparatus according to the present embodiment and corresponds to the display unit 106 of the car navigation apparatus 401 shown in FIG. 33. In FIG. 34, as the user specified "Supermarket E" as a destination, "Supermarket E" is always displayed. "Supermarket F", "Home", "Convenience store D", and "Restaurant A" are presented as stops. Looking at this, the user can judge whether to stop by on the way to "Supermarket E".

As described above, according to the present embodiment, the past travel histories are accumulated, the destination specified by the user from the predicted arrival places that match the current position and the current period of time and to which the user is likely to go is received, and the destination and the stops to which the user goes before returning to the base point are extracted. In the case where the order of the destination and the stops can be changed, the travel patterns each including the destination are extracted from the travel histories, and the estimated arrival time of each travel pattern is displayed. Accordingly, for a travel over arrival places to which the user wants to go, the user can know, by comparison, orders to visit the arrival places and an estimated arrival time at each arrival place with simple operation.

It is to be noted that although the present embodiment has described the example where the user specifies the destination from the predicted arrival places, the destination specifying unit 416, for example, may determine, as a destination, an arrival place that is in a travel history in which a point having the same ID with the current position is departed from at the current period of time and which has the largest number of occurrences. In this case, the user needs no destination specification operation.

Fifth Embodiment

The first embodiment has described the example where the order to visit the arrival places in the travel pattern having the largest number of occurrences is changed, and the travel plans are compared with one another. Further, the third embodiment has described the example where the sets of arrival places each having the large number of occurrences are presented to the user, and then the travel patterns in each of which the order to visit the arrival places has been changed and the estimated arrival times are presented to the user with respect to the set selected by the user.

A fifth embodiment will describe an example where a ratio of the number of occurrences of a set of arrival places to the numbers of occurrences of sets of all arrival places is calculated, and a mode of displaying travel patterns and estimated arrival times for a user is changed according to the ratio.

Figure 35:
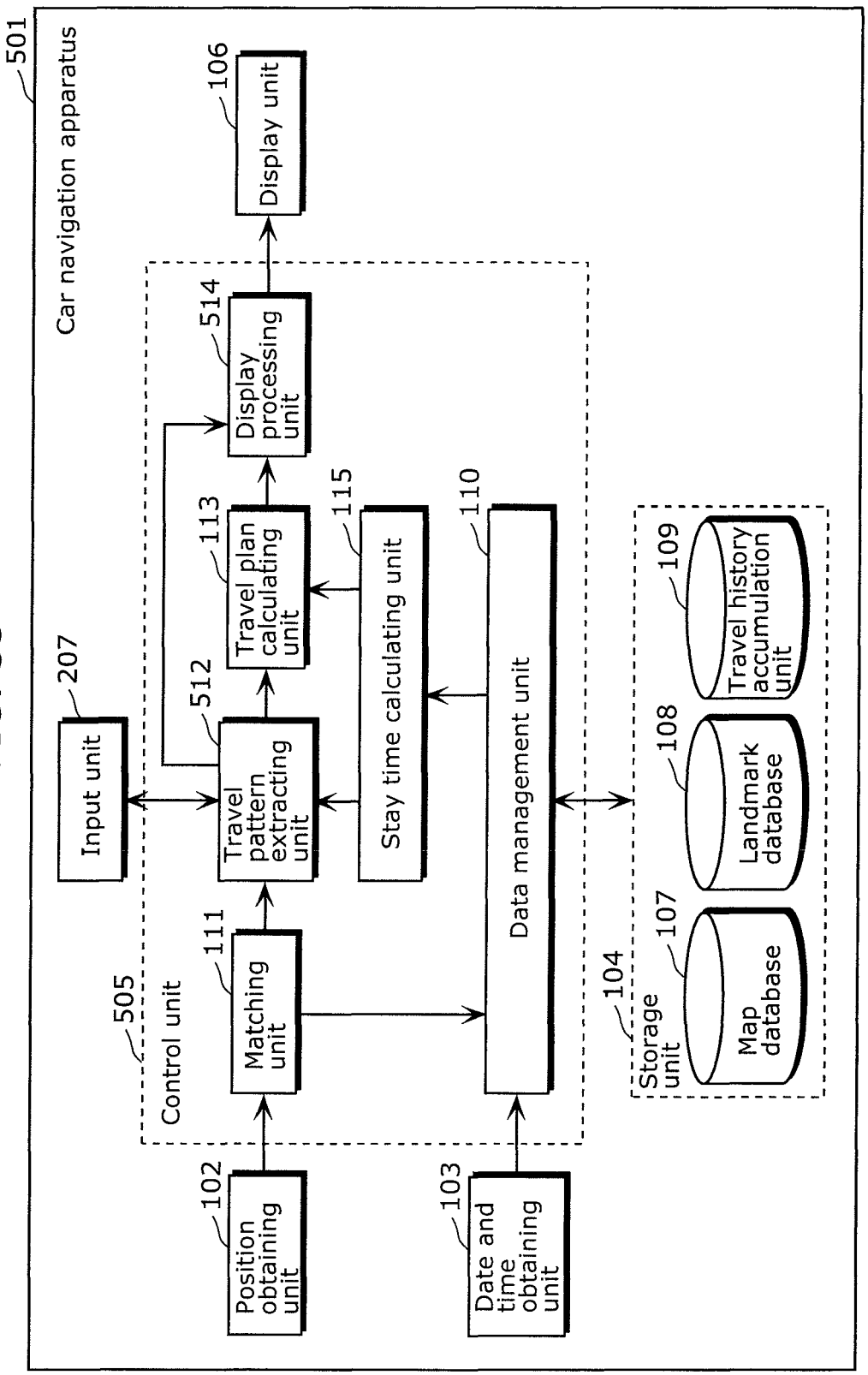
FIG. 35 is a functional block diagram of a travel plan presenting apparatus according to a fifth embodiment.

The present embodiment is also an example where a travel plan presenting apparatus is applied to a car navigation apparatus to be loaded in a car. FIG. 35 is a functional block diagram illustrating a structure of the car navigation apparatus to which the travel plan presenting apparatus is applied according to the present embodiment. As shown in FIG. 35, although a car navigation apparatus 501 according to the present embodiment has the same structure as the car navigation apparatus 301 according to the third embodiment shown in FIG. 24, the control unit 305 is replaced by a control unit 505 in the car navigation apparatus 501. The control unit 505 includes a travel pattern extracting unit 512 and a display processing unit 514 instead of the travel pattern extracting unit 312 and the display processing unit 314, respectively.

The travel pattern extracting unit 512 and the display processing unit 514 perform operations that differ slightly from those performed by the travel pattern extracting unit 312 and the display processing unit 314. The following will describe the car navigation apparatus 501 according to the fifth embodiment, focusing on the differences from the above-mentioned embodiments.

Figure 36:
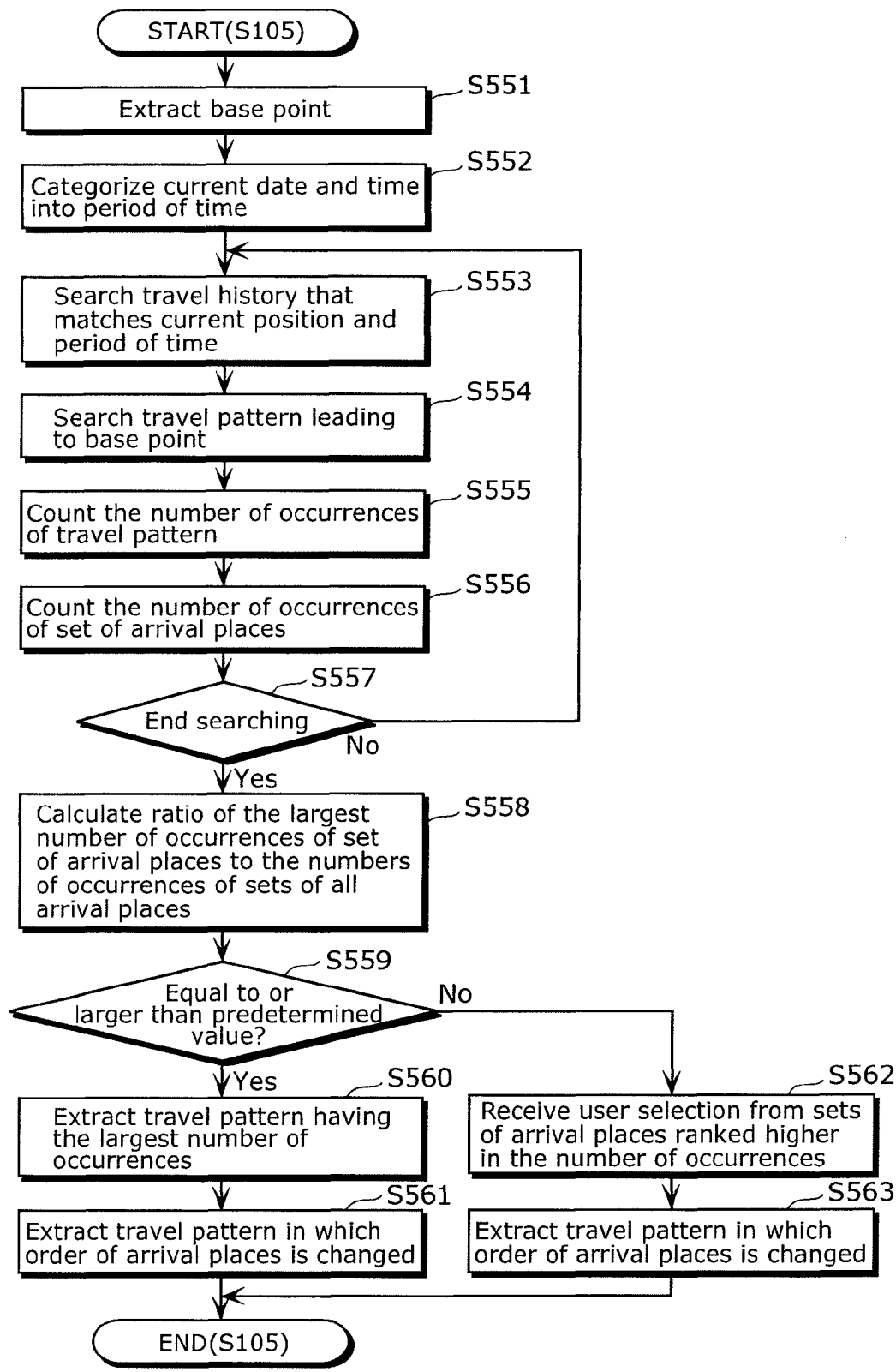
FIG. 36 is a flow chart illustrating a process flow according to the fifth embodiment.

Here, the travel pattern extraction process (S105 in FIG. 7) having a difference from the one in the third embodiment will be described using the flow chart of FIG. 36. The description of other parts will be omitted since such parts are the same as in the third embodiment.

As processes from a base point extraction process (S551) to a counting process (S555) and a judgment process (S557) are the same as those from the base point extraction process (S151) to the counting process (S155) and the judgment process (S156), the description of these processes will be omitted.

After the number of occurrences of a travel pattern is counted (S555), as with the third embodiment, the travel pattern extracting unit 512 views a history pattern retrieved in a travel pattern retrieving process (S554) as a set of arrival places, and adds 1 to a count of the set of arrival places when the set of arrival places has been found in the travel patterns accumulated in the travel history accumulation unit 109, and sets the count to 1 when not found (S556). In this manner, the number of occurrences of each of sets of arrival places is counted.

Figure 37:
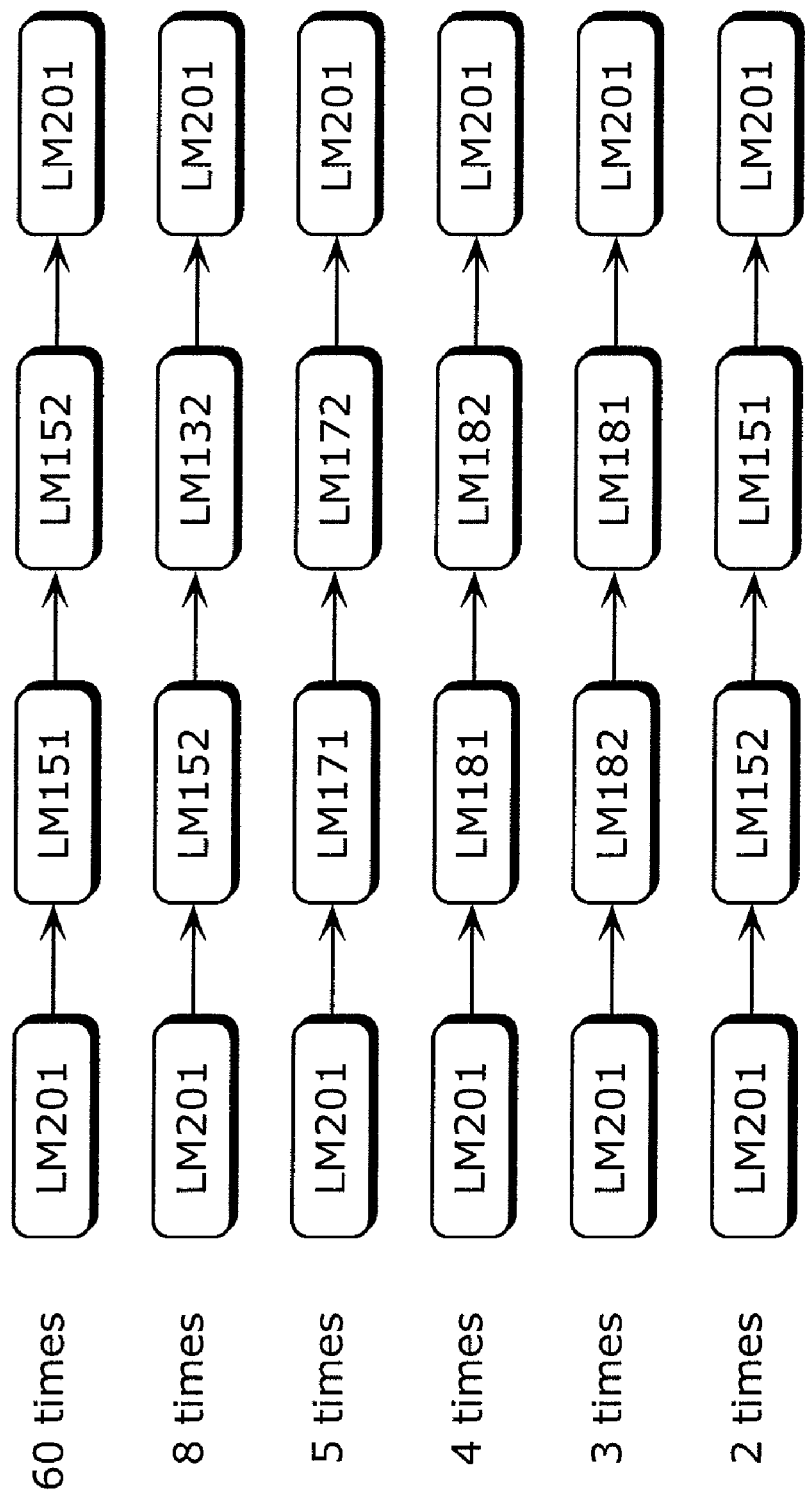
FIG. 37 is a schematic view illustrating an example of travel patterns according to the fifth embodiment.

After the numbers of occurrences of the sets of all arrival places is counted (Yes in S557), the travel pattern extracting unit 512 calculates a ratio of the number of occurrences of the set of arrival places having the largest number of occurrences to the numbers of occurrences of the sets of all arrival places (S558). A calculation example will be described using FIGS. 37 and 38. In the case where the numbers of occurrences of travel patterns counted in the counting process (S555) are what is shown in FIG. 37, the numbers of occurrences of sets of arrival places counted in the counting process (S556) are, through the same process as in the third embodiment, what is shown in FIG. 38. From FIG. 38, a sum of the numbers of occurrences of the sets of all arrival places is 82 (=62+8+7+5) times, and since the number of occurrences of the set (LM151, LM152) having the largest number of occurrences is 62 times, an occurrence ratio calculated is 75.6% (=62/82× 100).

The travel pattern extracting unit 512 judges whether or not the occurrence ratio calculated in the occurrence ratio calculation process (S558) exceeds a predetermined value (e.g., 70%) (S559). Here, exceeding the predetermined value means that a probability that the user visits the set of arrival places having the largest number of occurrences is overwhelmingly higher than a probability that the user visits other set of arrival places. In the case shown in FIG. 38, it is judged that the predetermined value is exceeded.

Figure 39:
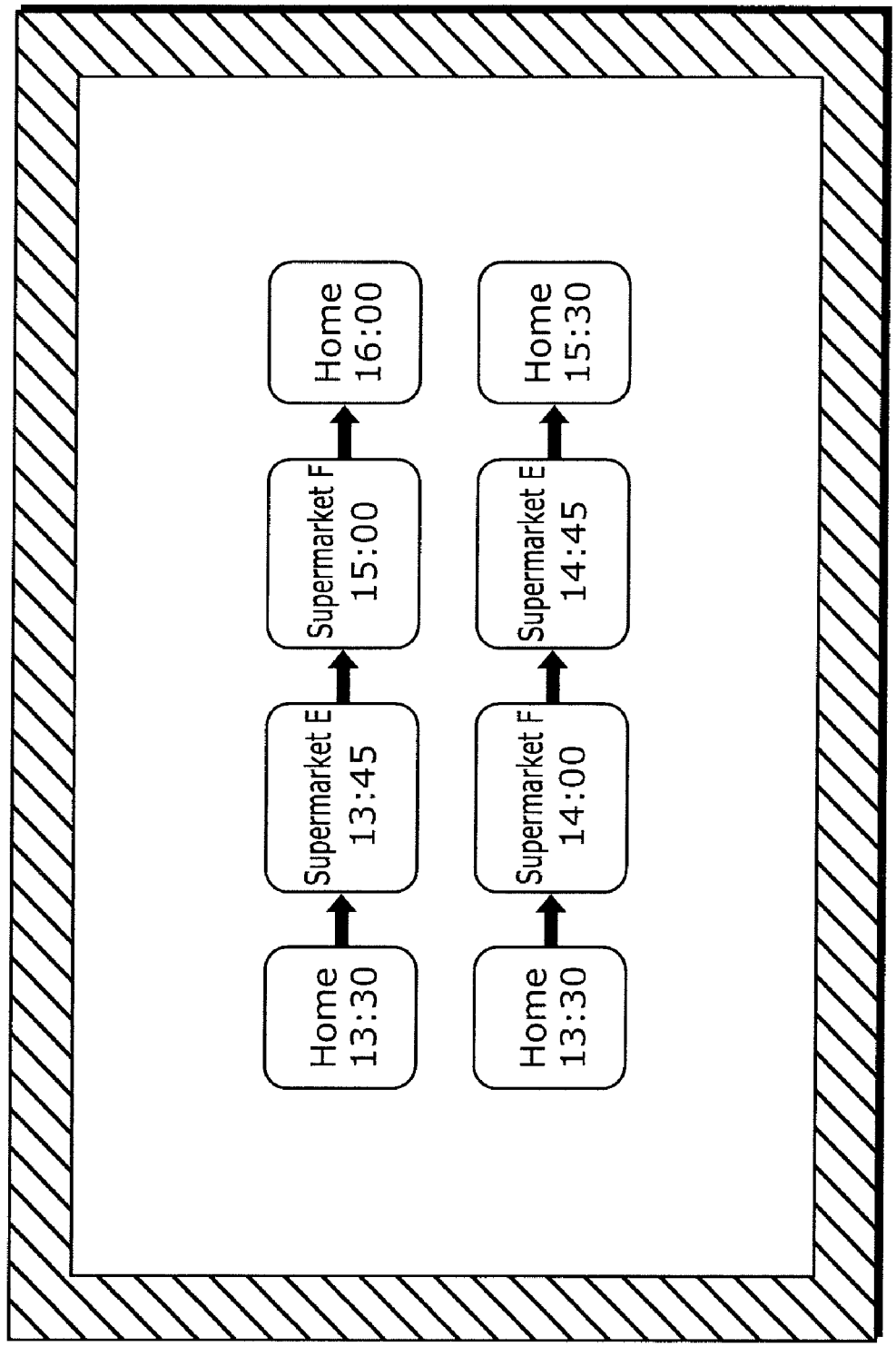
FIG. 39 is a diagram illustrating a display example according to the fifth embodiment.

In the case where the occurrence ratio exceeds the predetermined value (Yes in S559), the travel pattern extracting unit 512 performs the travel pattern extraction process (S560 and S561). The travel pattern extraction process (S560 and S561) is the same as the travel pattern extraction process (S157 and S158) in the first embodiment. Finally, through the processes performed by the travel plan calculating unit 113 and the display processing unit 514, as shown in FIG. 39, the travel patterns and the estimated arrival times are presented to the user via the display unit 106. In FIG. 39, LM151 is "Supermarket E" and LM152 is "Supermarket F", and a travel pattern from "Home" to "Supermarket E" to "Supermarket F" and back to "Home", which has the largest number of occurrences, and estimated arrival times at the places in the travel pattern as well as a travel pattern from "Home" to "Supermarket F" to "Supermarket E" and back to "Home", in which an order to visit "Supermarket E" and "Supermarket F" that are accumulated in the travel history accumulation unit 109 has been reversed, and estimated arrival times at the places in the travel pattern are presented.

Figure 40:
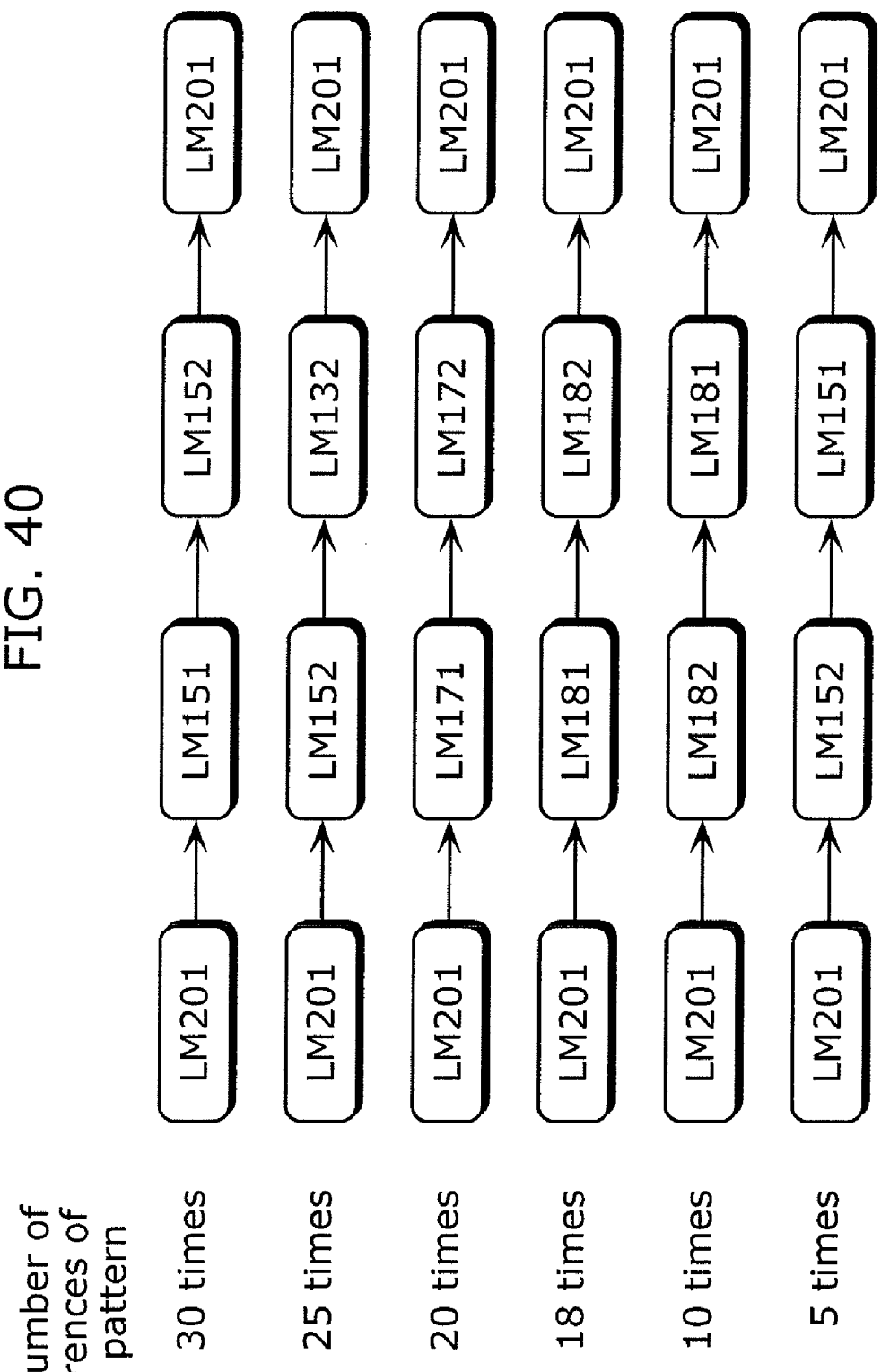
FIG. 40 is a schematic view illustrating an example of travel patterns according to the fifth embodiment.
Figure 42:
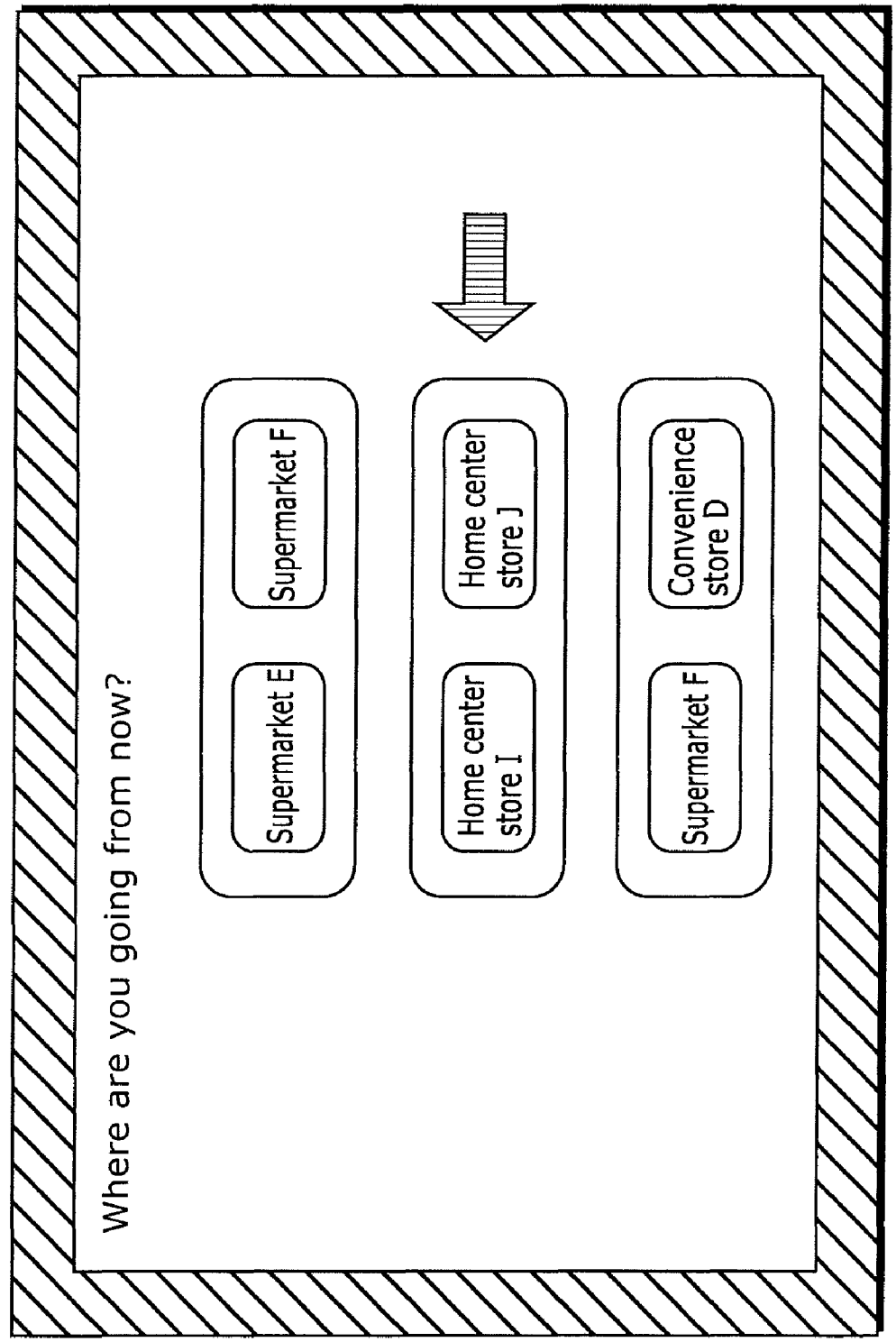
FIG. 42 is a diagram illustrating an example of presenting sets of arrival places for a user to select according to the fifth embodiment.
Figure 43:
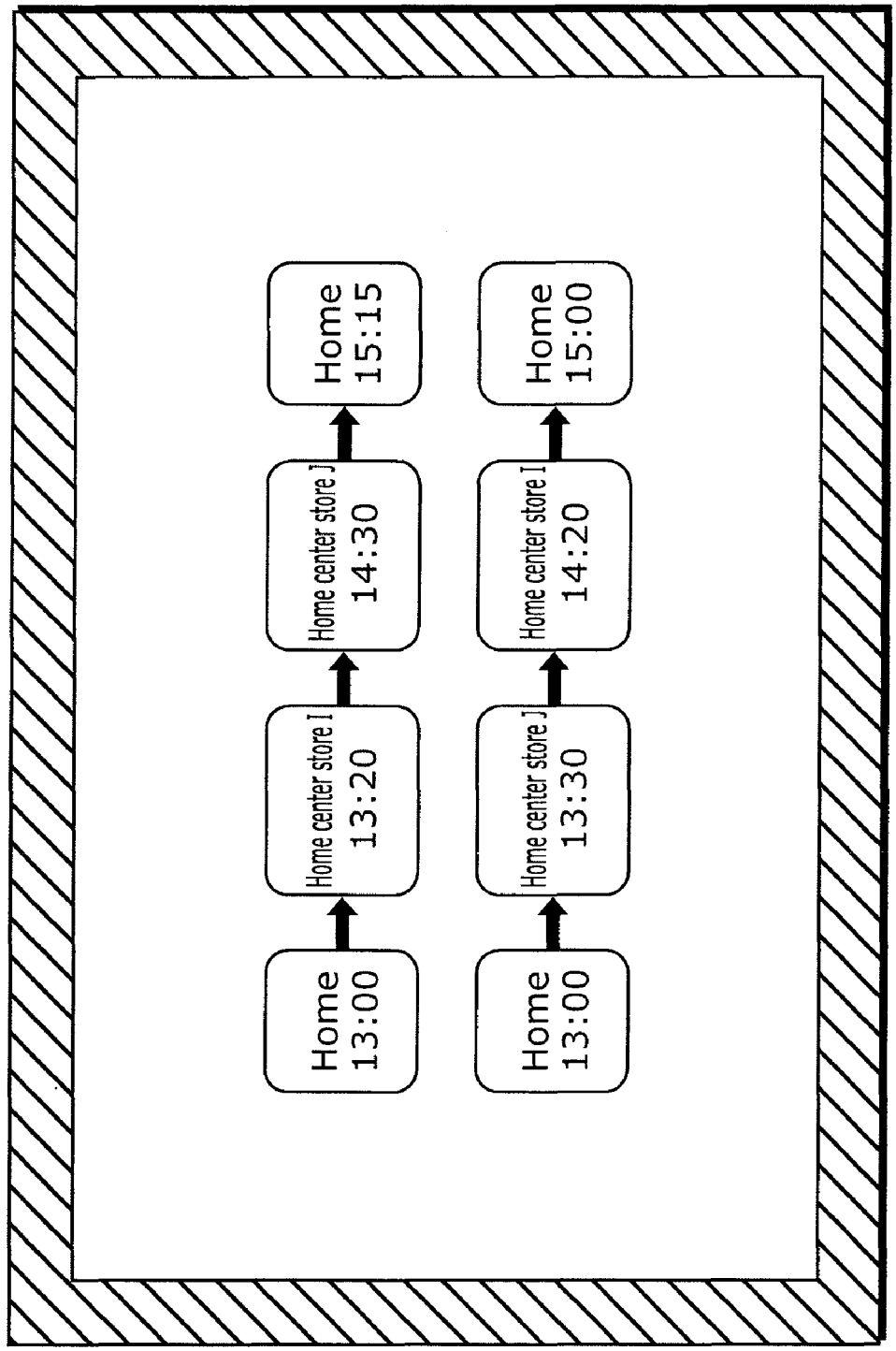
FIG. 43 is a diagram illustrating a display example according to the fifth embodiment.

On the other hand, in the case where the numbers of occurrences of travel patterns counted in the counting process (S555) are what is shown in FIG. 40, the numbers of occurrences of sets of arrival places counted in the counting process (S556) are, through the same process as in the third embodiment, what is shown in FIG. 41. From FIG. 41, as a sum of the numbers of occurrences of the sets of all arrival places is 109 times and the number of occurrence of the set (LM151, LM152) having the largest number of occurrences is 35 times, an occurrence ratio calculated in the occurrence ratio calculation process is 32.1% (=35/109×100). It is then judged in the judgment process (S559) that the occurrence ratio does not exceed a predetermined value (e.g., 70%). In other words, it means that the user is highly uncertain as to which set of arrival places the user visits from now, and cannot narrow down the sets of arrival places to one set of arrival places. An input selection receiving process (S562) and a travel pattern extraction process (S563), which are processes at this time, are the same as the input selection receiving process (S357) and the travel pattern extraction process (S358) in the third embodiment. Through the process performed by the display processing unit 514, as shown in FIG. 42, the sets of arrival places extracted by the travel pattern extracting unit 512 are presented to the user by the display unit 106. In FIG. 42, LM 151 is "Supermarket E", LM152 "Supermarket F", LM181 "Home center store I", LM182 "Home center store J", and LM132 "Convenience store D". After the display unit 106 presents the sets of arrival places to the user as shown in FIG. 42, when receiving a user selection from the input unit 207, the travel pattern extracting unit 512 extracts travel patterns that are accumulated in the travel history accumulation unit 109 and in each of which an order of the arrival places has been changed with respect to the selected set of arrival places. Finally, through the processes performed by the travel plan calculating unit 113 and the display processing unit 514, the display unit 106 presents the travel patterns and the estimated arrival times as shown in FIG. 43.

As described above, the present embodiment is characterized in that the mode of displaying is changed according to the probability that the user visits the set of arrival places having the largest number of occurrences. When the probability that the user visits the set of arrival places is high, displaying travel patterns in each of which an order of the arrival places has been changed and estimated arrival times enables the user to determine the optimal order to visit the arrival places without making effort to select a set of arrival places. Furthermore, when the probability that the user visits the set of arrival places is low, sets of arrival places are presented to the user so that the user can select a set of arrival places, and accordingly displaying travel patterns in each of which an order of the arrival places has been changed and estimated arrival times prevents an increase in information amount (in the case of FIG. 41, six travel patterns and estimated arrival time information for three sets of arrival places) on a screen. Moreover, from a point of view of display information amount and efforts of operation, it is possible to provide a function that displaying only candidates for the set of arrival places enables the user to determine the optimal order with one operation, which removes the burden of the user.

As is obvious from the above, according to the travel plan presenting apparatus of the present invention, based on the past travel history data, after judging whether an order of arrival places can be changed, which are in each of travel patterns and to which the user is predicted to go from now on the basis of the current position and the current date and time, estimated arrival times at each arrival place are compared and displayed. Accordingly, for a travel over the arrival places, the user can know, by comparison, orders to visit the arrival places and an arrival time at each arrival place, and this is very effective.

Although the travel plan presenting apparatus according to the present invention has been described based on the embodiments 1 to 5, the present invention is not limited to these embodiments. The present invention includes modifications of the above embodiments and other embodiments realized by combining each of components in the embodiments 1 to 5 in a given manner, the modifications and the other embodiments not deviating from the gist of the present invention.

Moreover, specifically, each of the above-mentioned apparatuses may be configured as a computer system including a microprocessor, a ROM, a RAM, a hard disk drive, a display unit, a keyboard, a mouse, and the like. The RAM or the hard disk drive stores a computer program. The operations of the microprocessor according to the computer program enable the apparatus to perform its functions. Here, in order to perform predetermined functions, the computer program is configured by combining operation codes each indicating an instruction to a computer.

Further, part or all of the components included in the apparatus may be included in one system large scale integration (LSI). The system LSI is a super-multifunctional LSI manufactured by integrating component units on one chip, and is specifically a computer system including a microprocessor, a ROM, a RAM, and the like. The RAM stores the computer program. The operations of the microprocessor according to the computer program enable the system LSI to perform its functions.

Furthermore, part or all of the components included in the apparatus may be included in an IC card removable from the apparatus or in a stand alone module. The IC card or the module is a computer system including a microprocessor, a ROM, a RAM, and the like. The IC card or the module may include the above-mentioned super-multifunctional LSI. The operations of the microprocessor according to the computer program enable the IC card or the module to perform its functions. The IC card or the module may have tamper-resistance.

Moreover, the present invention may be the above-mentioned methods. In addition, the present invention may be a computer program causing a computer to execute these methods, and a digital signal composed of the computer program.

Further, in the present invention, the computer program or the digital signal may be recorded on a computer-readable recording medium such as a flexible disk, a hard disk, a CD-ROM, an MO, a DVD, a DVD-ROM, a DVD-RAM, a Blu-ray Disc, and a semiconductor memory. In addition, the digital signal may be recorded on these recording media.

Moreover, in the present invention, the computer or the digital signal may be transmitted via an electronic communication line, a wireless or wired communication line, a network represented by the Internet, data broadcasting, and the like.

Furthermore, the present invention may be a computer system including a microprocessor and a memory. The memory may store the computer program, and the microprocessor may operate according to the computer program.

Moreover, the present invention may execute the computer program or the digital signal in another independent computer system by recording the computer program or the digital signal on the recording medium and transmitting the computer program or the digital signal via the network and the like.

INDUSTRIAL APPLICABILITY

A travel plan presenting apparatus according to the present invention has functions to predict arrival places of a user of the travel plan presenting apparatus and present predicted travel patterns to the user in such a way that the user can compare the travel patterns, and is useful for a car navigation apparatus to be loaded in a car and an information terminal such as a mobile phone carried by the user. Furthermore, a travel pattern presenting method is useful for a program operating in the car navigation apparatus or on the information terminal, and for a program on a server system providing information to the car navigation apparatus or on the information terminal.

The invention claimed is:

1. A travel plan presenting apparatus comprising:
a travel pattern extracting unit configured to: retrieve, as travel patterns, sets of pieces of travel history information each including a current position and a final arrival place, from pieces of travel history information of a mobile object each being accumulated in a travel history accumulation unit and regarding a travel from a departure place to an arrival place; extract at least one travel pattern from the retrieved travel patterns; and, in the case where a travel pattern in which an order of halfway arrival places other than the final arrival place included in the extracted travel pattern has been changed exists in the pieces of travel history information of the mobile object, further extract the travel pattern in which the order of the arrival places has been changed;
a travel plan calculating unit configured to calculate, for each of the extracted travel patterns, estimated arrival times at the final arrival place and each of the arrival places included in a corresponding one of the travel patterns extracted by said travel pattern extracting unit; and
a display processing unit configured to generate display information for displaying, on a same screen, for each extracted travel pattern, the estimated arrival time at each arrival place that has been calculated by said travel plan calculating unit, and display the display information on the screen.

2. The travel plan presenting apparatus according to claim 1,
wherein said travel pattern extracting unit is configured to: retrieve, as the travel patterns, the sets of the pieces of travel history information each including the current position and the final arrival place, from the pieces of travel history information accumulated in the travel history accumulation unit; extract, from the retrieved travel patterns, a predetermined number of travel patterns in descending order of the number of occurrences; and, in the case where a travel pattern in which an order of halfway arrival places other than the final arrival place included in a corresponding one of the extracted travel patterns has been changed exists in the pieces of accumulated travel history information, further extract the travel pattern in which the order of the arrival places has been changed.

3. The travel plan presenting apparatus according to claim 1,
wherein said travel pattern extracting unit is configured to: retrieve, as the travel patterns, the sets of the pieces of travel history information each including the current position and the final arrival place, from the pieces of travel history information accumulated in the travel history accumulation unit; categorize each of the retrieved travel patterns into a set of arrival places included in a corresponding one of the travel patterns; extract a travel pattern including a set of arrival places to be selected by a user from the categorized sets of the arrival places; and, in the case where a travel pattern in which an order of halfway arrival places other than the final arrival place included in the extracted travel pattern has been changed exists in the pieces of accumulated travel history information, further extract the travel pattern in which the order of the arrival places has been changed,
said display processing unit is further configured to generate display information for displaying the sets of the arrival places categorized by said travel pattern extracting unit, and display the display information on the screen, and
said travel plan presenting apparatus further includes an input unit configured to receive from a user a selection of one of the sets of the arrival places that are included in the display information generated by said display processing unit.

4. The travel plan presenting apparatus according to claim 1,
wherein said travel pattern extracting unit is configured to: retrieve, as the travel patterns, the sets of the pieces of travel history information each including the current position and the final arrival place, from the pieces of travel history information accumulated in the travel history accumulation unit; categorize each of the retrieved travel patterns into a set of arrival places included in a corresponding one of the travel patterns; calculate a ratio of a largest number of occurrences of a set of arrival places to a sum of the numbers of occurrences of the sets of the arrival places; in the case where the ratio is equal to or greater than a predetermined value, extract, from the retrieved travel patterns, a predetermined number of travel patterns in descending order of the number of occurrences; in the case where a travel pattern in which an order of halfway arrival places other than the final arrival place included in a corresponding one of the extracted travel patterns has been changed exists in the pieces of accumulated travel history information, further extract the travel pattern in which the order of the arrival places has been changed; in the case where the ratio is less than the predetermined value, extract a travel pattern including a set of arrival places to be selected by a user from the categorized sets of the arrival places; and, in the case where a travel pattern in which an order of halfway arrival places other than the final place included in the extracted travel pattern has been changed exists in the pieces of accumulated travel history information, further extract the travel pattern in which the order of the arrival places has been changed,
said display processing unit is further configured, in the case where the ratio is less than the predetermined value, to generate display information for displaying the sets of the arrival places categorized by said travel pattern extracting unit, and display the display information on the screen, and said travel plan presenting apparatus further includes an input unit configured to receive from a user a selection of one of the sets of the arrival places that are included in the display information generated by said display processing unit, in the case where the ratio is less than the predetermined value.

5. The travel plan presenting apparatus according to claim 1, wherein said display processing unit is configured, only in the case where the estimated arrival time at the final arrival place of the travel pattern which is extracted by said travel pattern extracting unit and in which the order of the arrival places has been changed is earlier than an estimated arrival time at the final arrival place of the travel pattern in which the order of the halfway arrival places has not been changed, to generate, as display information, an estimated arrival time at each of the final and halfway arrival places included in the travel pattern in which the order of the arrival places has been changed and the travel pattern in which the order of the arrival places has not been changed, and display the display information on the screen.

6. The travel plan presenting apparatus according to claim 1, wherein said display processing unit is further configured to generate the display information so that a mode of displaying is different for a set of halfway arrival places of which an order is to be changed by said travel pattern extracting unit and for arrival places other than the set of the arrival places, and display the display information on the screen.

7. travel plan presenting apparatus according to claim 6, wherein said display processing unit is configured to generate, as the display information, information for displaying with a common icon each of the arrival places other than the set of the halfway arrival places of which the order is to be changed, information indicating a branch from an arrival place immediately previous to the set of the halfway arrival places of which the order is to be changed to first arrival places in the set of the halfway arrival places of which the order is to be changed, information indicating a junction from last arrival places in the set of the halfway arrival places of which the order is to be changed to an arrival place immediately after the set of the halfway arrival places of which the order is to be changed, and information for displaying the estimated arrival time at each arrival place, and to display the display information, the arrival places other than the set of the halfway arrival places and the set of the halfway arrival places being included in the travel pattern in which the order has been changed and the travel pattern in which the order has not been changed.

8. A travel pattern presenting method comprising:

retrieving, as travel patterns, sets of pieces of travel history information each including a current position and a final arrival place, from pieces of travel history information of a mobile object each being accumulated in a travel history accumulation unit and regarding a travel from a departure place to an arrival place; extracting at least one travel pattern from the retrieved travel patterns; and, in the case where a travel pattern in which an order of halfway arrival places other than the final arrival place included in the extracted travel pattern has been changed exists in the pieces of travel history information of the mobile object, further extracting the travel pattern in which the order of the arrival places has been changed, the searching, the extracting, and the extracting being executed by a computer;

calculating, for each of the extracted travel patterns, estimated arrival times at the final arrival place and each of the halfway arrival places included in a corresponding one of the travel patterns extracted by said travel pattern extracting unit, the calculating being executed by the computer; and generating display information for displaying, on a same screen, for each extracted travel pattern, the estimated arrival time at each arrival place that has been calculated by said travel plan calculating unit, and displaying the display information on the screen, the generating and the displaying being executed by the computer.

9. A program, embodied on a non-transitory computer-readable medium, the program causing a computer to execute:

retrieving, as travel patterns, sets of pieces of travel history information each including a current position and a final arrival place, from pieces of travel history information of a mobile object each being accumulated in a travel history accumulation unit and regarding a travel from a departure place to an arrival place; extracting at least one travel pattern from the retrieved travel patterns; and, in the case where a travel pattern in which an order of halfway arrival places other than the final arrival place included in the extracted travel pattern has been changed exists in the pieces of travel history information of the mobile object, further extracting the travel pattern in which the order of the arrival places has been changed;

calculating, for each of the extracted travel patterns, estimated arrival times at the final arrival place and each of the halfway arrival places included in a corresponding one of the travel patterns extracted by said travel pattern extracting unit; and generating display information for displaying, on a same screen, for each extracted travel pattern, the estimated arrival time at each arrival place that has been calculated by said travel plan calculating unit, and displaying the display information on the screen.

* * * * *